(12) United States Patent
Poe et al.

(10) Patent No.: US 7,755,032 B2
(45) Date of Patent: Jul. 13, 2010

(54) MEASURING INFLOW PERFORMANCE WITH A NEUTRON LOGGING TOOL

(75) Inventors: Bobby D. Poe, Houston, TX (US); Robert J. Butsch, Tomball, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 622 days.

(21) Appl. No.: 11/278,444

(22) Filed: Apr. 3, 2006

(65) Prior Publication Data

US 2007/0108380 A1 May 17, 2007

Related U.S. Application Data

(60) Provisional application No. 60/671,944, filed on Apr. 15, 2005.

(51) Int. Cl.
*G01V 5/10* (2006.01)
(52) U.S. Cl. .................................................. 250/269.6
(58) Field of Classification Search ............. 250/269.3, 250/269.6, 269.7
See application file for complete search history.

(56) References Cited

U.S. PATENT DOCUMENTS

| | | | |
|---|---|---|---|
| 4,035,640 A | 7/1977 | Arnold et al. | |
| 4,737,636 A | 4/1988 | Smith, Jr. | |
| 5,306,911 A | 4/1994 | Hunt | |
| 5,461,909 A | 10/1995 | Arnold | |
| 5,552,598 A * | 9/1996 | Kessler et al. | 250/269.3 |
| 5,633,470 A * | 5/1997 | Song | 73/861.04 |
| 5,949,069 A * | 9/1999 | Chace et al. | 250/269.7 |
| 6,112,817 A * | 9/2000 | Voll et al. | 166/370 |
| 6,279,660 B1 * | 8/2001 | Hay | 166/336 |
| 6,684,956 B1 * | 2/2004 | Berry | 166/313 |
| 7,186,971 B2 * | 3/2007 | Riley et al. | 250/269.6 |
| 2003/0139916 A1 * | 7/2003 | Choe et al. | 703/10 |
| 2005/0284626 A1 * | 12/2005 | Riley et al. | 166/250.01 |

FOREIGN PATENT DOCUMENTS

| | | |
|---|---|---|
| EP | 0421844 A1 | 9/1990 |
| EP | 0645520 A1 | 3/1995 |
| GB | 1505437 A | 3/1978 |
| GB | 2268264 A | 1/1994 |
| GB | 2331361 A | 5/1999 |

OTHER PUBLICATIONS

Poe et al., "Determination of Multilayer Reservoir Inflow Profiles using Pulsed Neutron Logs," SPE 94266, SPE Production and Operations Symposium, Oklahoma City OK, Apr. 17-19, 2005.
Trcka, Darryl et al.,"Measuring Three-Phase Holdups Wellbores Using Pulsed Neutron Instruments",SPE Annual Technical Conference and Exhibition,Oct. 6-9,1996, SPE 36561,Denver.

* cited by examiner

*Primary Examiner*—David P Porta
*Assistant Examiner*—Djura Malevic
(74) *Attorney, Agent, or Firm*—Osha Liang LLP

(57) ABSTRACT

A method for evaluating an inflow performance for completed intervals in a well includes pulsing neutrons into a fluid flow in the wellbore, detecting gamma rays from decays of nitrogen-16 in the well fluid flow with a first gamma ray detector, determining an in situ water velocity from the measurement of the gamma ray decays, and estimating the inflow performance of one or more competed intervals in the well from data that includes the in situ water velocity.

50 Claims, 15 Drawing Sheets

MEASURING INFLOW PERFORMANCE WITH A NEUTRON LOGGING TOOL

This application claims the benefit of the filing date of U.S. Provisional Patent Application No. 60/671,944 filed Apr. 15, 2005, the disclosure of which is incorporated herein by reference.

BACKGROUND OF THE INVENTION

This invention related generally to a method for determining the inflow performance of multilayer reservoirs with multiple completed intervals that have been completed into a single wellbore. More specifically, some embodiments of the invention relate to methods for determining the liquid holdup and liquid and gas velocities in such a production wellbore, although the invention may be applied to other types of flow systems.

Wells are generally drilled to recover natural deposits of hydrocarbons and other materials trapped in subterranean formations. As the well is drilled, casing is installed in the wellbore that both supports the walls of the drilled hole and provides a flow passage to the surface. Perforations are subsequently made in the casing which extend into the formations at selected locations so that well fluids may flow through the perforations and into the casing. FIG. 1 shows a cross section of a typical well 101 penetrating a formation 103. The well 101 is lined with a casing 102, and the casing 102 and the formation 103 include one or more perforated zones 111, 112, 113. Formation fluids may flow from the formation 103 into the wellbore 101, where they may be transported to the surface.

Each perforated zone 111, 112, 113 shown in FIG. 1 represents an area of the well that has been perforated, typically using shaped-charged explosives, so that the formation fluids may flow into the wellbore and be transported to the surface. Each zone 111, 112, 113 is located in an area where the formation is believed to contain desirable fluids, such as oil, gas, or other hydrocarbons.

In many cases, a tubing string is placed in the wellbore, and the formation fluids are transported to the surface through the tubing string rather than the casing. FIG. 2 shows a tubing string 201 placed in a well 101 so that the production fluid flows to the surface through the tubing 201. One or more packers 203 may be used to isolate the interval containing the production zones 111, 112, 113 in the multi-layer reservoir and to stabilize the production tubing 201 in the well 101. In some cases, this is done because other production zones exist above or below the production zones 111, 112, 113 shown in FIG. 2. The packer 203 seals the annulus between the tubing and the casing so that only the formation fluids from the desired production zones 111, 112, 113 may flow through the tubing 201. Additional strings of tubing may be installed for producing from other intervals.

After the well has been completed, production logging may be used to obtain in situ measurements of the nature and behavior of the fluids in or around the wellbore during production. The purpose of production logging is to analyze the flowing performance of a well, including the productivity of different production zones in the well. This enables the well operator to produce and obtain maximum production from the well in the most economical way possible.

FIG. 3 shows one example of how production well logging may be performed. The tubing string 201 in positioned such that the lower end of the tubing string is located above the uppermost production zone 111 in the reservoir. A production logging tool 301 is lowered into the well 101 and data are taken as the tool 301 is moved through a vertical region where the measurements are to be taken. In FIG. 3, the production logging tool 301 is positioned between the two uppermost production zones 111, 112, where it may be used to measure flow rates, pressure, temperature, fluid mixture density, and fractions of liquid and gas, among other parameters. By positioning the production logging tool 301 in the position shown in FIG. 3, it will measure the cumulative flow that results from the inflow from production zones 112 and 113. The production logging tool 301 is shown schematically, and the tool 301 in FIG. 3 does not represent the shape or relative size of an actual production logging tool. There are multiple types of production logging tools known in the art, such as spinners, pilot tubes and turbine meters, that are typically used in combination with other measurement probes, including optical scanning devices to measure the fractions of gas and liquid in well stream.

Using a production logging tool 301, the flow characteristics of the well fluid stream may be measured and recorded (or transmitted to the surface) at multiple points. For example, the production logging tool 301 may subsequently be moved to a position between the second and third production zones 112, 113. In such a position, the production logging tool 301 would measure and record (or transmit to the surface) data based on the inflow from the lowest production zone 113. In this manner, the inflow performance may be determined for each of the production zones 111, 112, 113 by measuring the composite flow characteristics as multiple locations.

It is noted that a multi-layer interval may contain more than two or three production zones. A production logging tool may be relocated between each zone so that data corresponding to the properties of the inflow from each zone may be determined.

SUMMARY OF THE INVENTION

In one aspect, the invention relates to a method for evaluating an inflow performance for completed intervals in a well that includes pulsing neutrons into a fluid flow in the wellbore, detecting gamma rays from decays of nitrogen-16 in the well fluid flow with a first gamma ray detector, determining an in situ water velocity from the measurement of the gamma ray decays, and estimating the inflow performance of one or more competed intervals in the well from data that includes the in situ water velocity. In some embodiments, determining the in situ water velocity may include determining a time for activated oxygen to flow from a pulsed neutron generator to the first gamma ray sensor and dividing a distance between the pulsed neutron generator and the gamma ray sensor by the time for the activated oxygen to flow from the pulsed neutron generator to the first gamma ray sensor.

In another aspect, the invention relates to a method for profiling multiphase fluid flow in a well that includes pulsing a first pulse of neutrons into the fluid flow, detecting gamma rays from inelastic collisions between the first pulsed neutrons and a nuclei in the fluid flow, determining an inelastic count rate from the detected gamma rays from the inelastic collisions, pulsing a second pulse of neutrons into the flow, detecting gamma rays from decays of nitrogen-16 in the flow, and determining a water velocity in the production fluid.

In another aspect, the invention relates to a downhole tool that includes a pulsed neutron generator and at least one gamma ray detector, wherein the downhole tool is configured to measure a velocity of water in a well fluid.

In another aspect, the invention relates to a method for profiling multiphase fluid flow in a well that includes pulsing a first pulse of neutrons into the fluid flow at a plurality of locations, detecting gamma rays from inelastic collisions between the first pulsed neutrons and a nuclei in the fluid flow at the plurality of locations, determining an inelastic count rate of the production from the detected gamma rays from the inelastic collisions at the plurality of locations, determining a liquid holdup at the plurality of locations based on the inelastic count rate at the plurality of locations, pulsing a second pulse of neutrons into the flow at the plurality of locations, detecting gamma rays from decays of nitrogen-16 in the flow at the plurality of locations, determining a water velocity in the production fluid at the plurality of locations, and determining the inflow performance of each of a plurality of production in the well based on the liquid holdup and the water velocity at the plurality of locations.

In another aspect, the invention related to a method for evaluating an inflow performance for completed intervals in a well that includes pulsing neutrons into a fluid flow in the wellbore, detecting gamma rays from inelastic collisions between the pulsed neutrons and a nuclei in the fluid flow, determining an inelastic count rate of the fluid from the detected gamma rays from the inelastic collisions, determining a liquid holdup of the fluid flow from the inelastic count rate, and determining the inflow performance of one or more competed intervals in the well from data that includes the liquid holdup.

In another aspect, the invention relates to a method for correcting an in situ gas phase velocity approximation that includes estimating a critical gas phase velocity. When the critical gas phase velocity if greater than the in situ average gas phase velocity, the method may also include determining a flow regime, estimating a bubble rise velocity, and computing a corrected in situ gas phase velocity.

DETAILED DESCRIPTION

The present invention is generally related to using a pulsed neutron logging tool to determine the water velocity in a well fluid flow, as well as the inelastic count rate, which may also be measured. This information may then be used in a multiphase fluid flow production or injection systems analysis to determine the inflow performance of the completed intervals in a multilayer reservoir.

Figure 1:
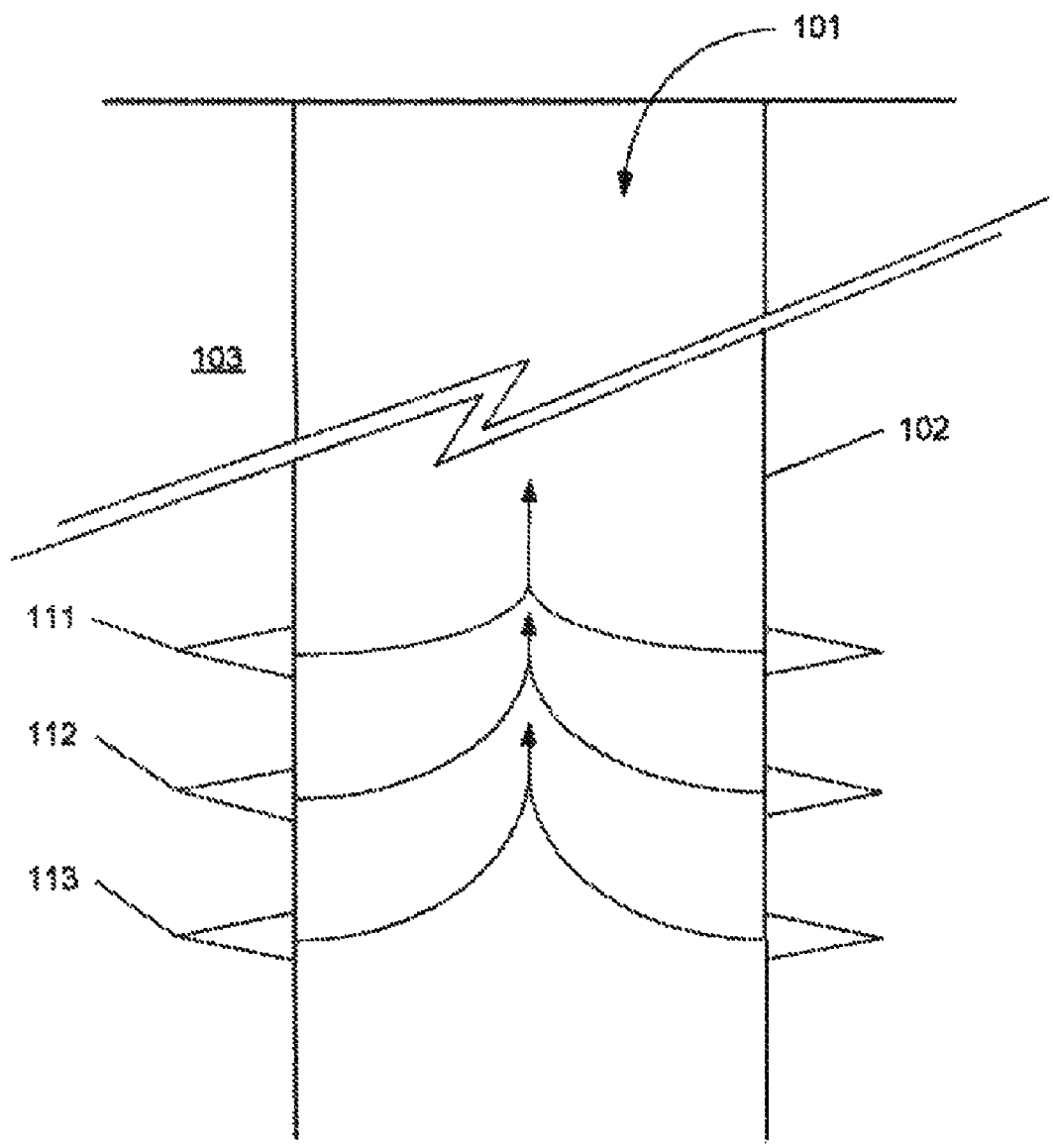
FIG. 1 shows a cross section of a typical well with a multilayer reservoir having multiple production zones.
Figure 2:
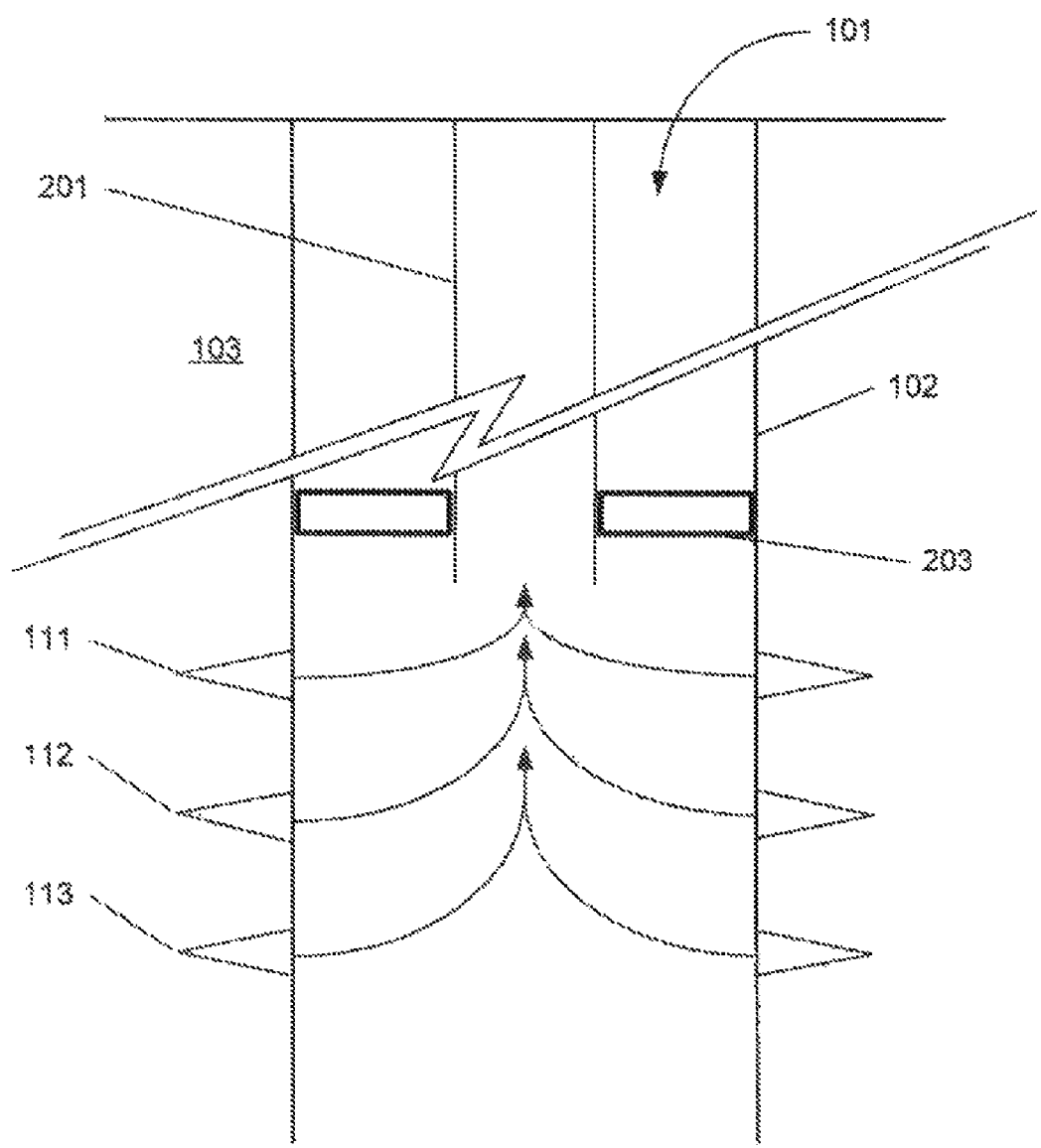
FIG. 2 shows a cross section of a well with a tubing string positioned in the well for transporting well fluids to the surface.
Figure 3:
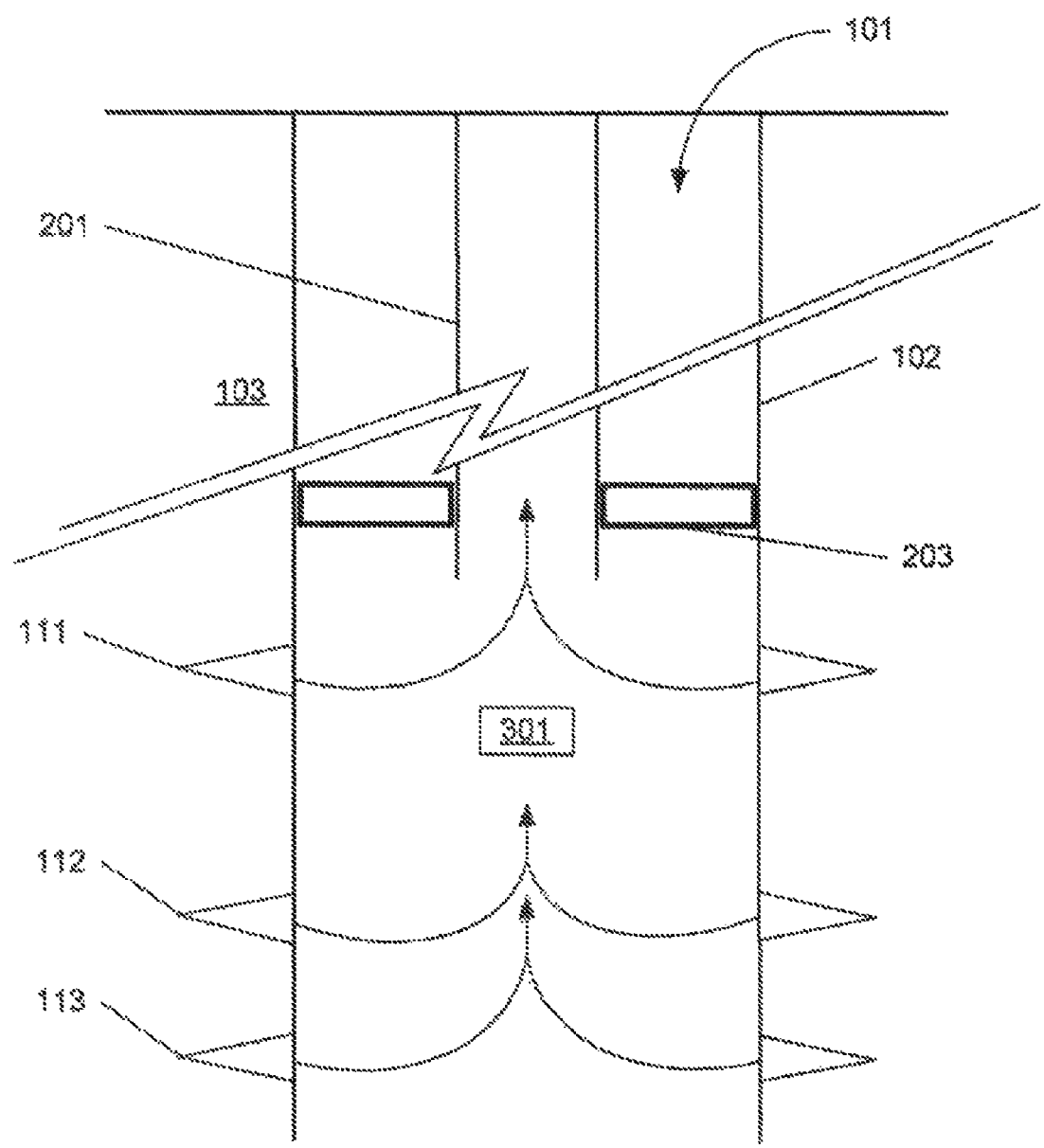
FIG. 3 shows a prior art production logging tool for characterizing the flow properties of a multilayer reservoir.
Figure 4:
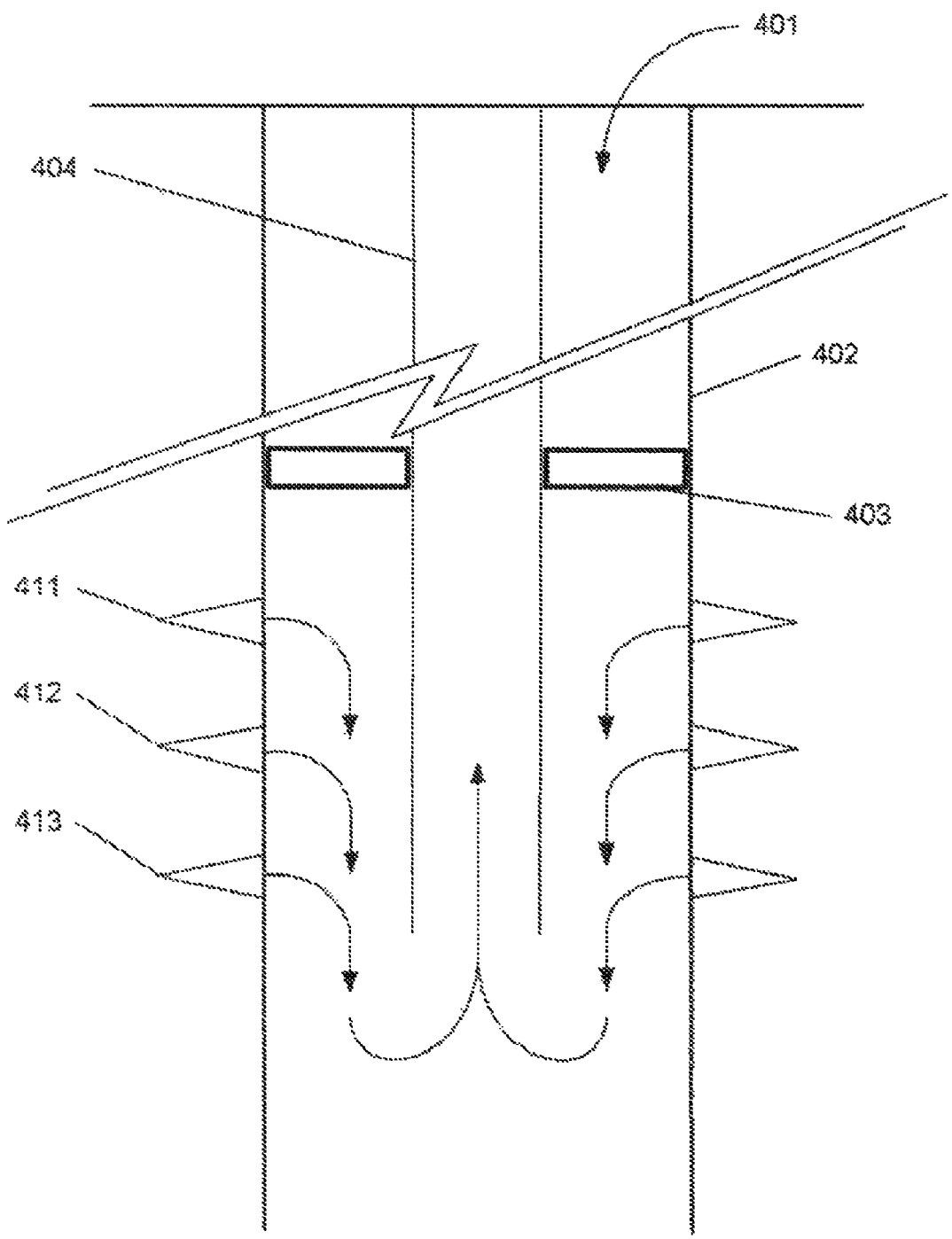
FIG. 4 shows a cross section of a well with a velocity string for unloading the well.

FIG. 4 shows a cross section of a production tubing or velocity string 404 positioned in well 401 having multiple production zones 411, 412, 413. A packer 403 may be used to seal the production zones 411, 412, 413 from the wellbore above and to force the produced fluids to flow into the velocity string 404. Typically, a velocity string 404 is used to maintain the wellbore fluid outflow velocity at a sufficient level so that formation produced or wellbore condensed liquids do not accumulate or increase in quantity in the wellbore 401 such that the reservoir energy would not be sufficient to produce those fluids to the surface. The velocity string 404 has a smaller diameter than the casing 402 or other production tubing (not shown) that may be used, and the smaller diameter causes the fluid at a given flow rate to flow at a higher velocity. The higher velocity may more efficiently lift the liquids in the wellbore 401 to the surface to minimize or prevent their accumulation in the well 401 which may result in an increase in hydrostatic pressure acting against the productive formations of completed intervals 411, 412, 413 in the well, resulting in "loading up" of the well and its ceasing to flow naturally. Using a velocity string 404 in this manner is often called "unloading" a well because the velocity string 404 enables fluids to flow from a well 401 that may otherwise be "loaded up" with fluids. A velocity string is generally described, but should not be considered limiting. Other types of tubulars may be used, and in some examples, the described methods and tools may be used within a casing, outside of any tubulars.

In some cases, a velocity string 404 must be located below the top of the upper most production zone 411 or completed interval. This is so that the fluids flowing into the well 401 must flow at a higher velocity starting at a lower position. Thus, as shown in FIG. 4, in some cases the velocity string 404 may even be positioned such that the bottom of the velocity string 404 is below the lowest production zone 413 in a multilayer reservoir.

Use of conventional production logging tools in the well 401 shown in FIG. 4 is not effective because the measurement devices, when positioned in the velocity string 404, would measure only the composite flow from the inflow from all of the production zones 411, 412, 413, and would be unable to measure fluid properties outside of the tubing. Moreover, it may not be possible to move the velocity string 404 vertically and then take measurements at selected locations. In many cases, this would cause the well 401 to become loaded up with fluids. In other cases, while there may still be a production flow, the inflow performance at each production zone 411, 412, 413 will vary based on the position of the velocity string 404. Thus, such a technique will not produce accurate results of inflow rates from the completed intervals 411, 412, 413 that are representative of their inflow contributions to the composite well production when the velocity string 404 is in a different vertical position.

Figure 5A:
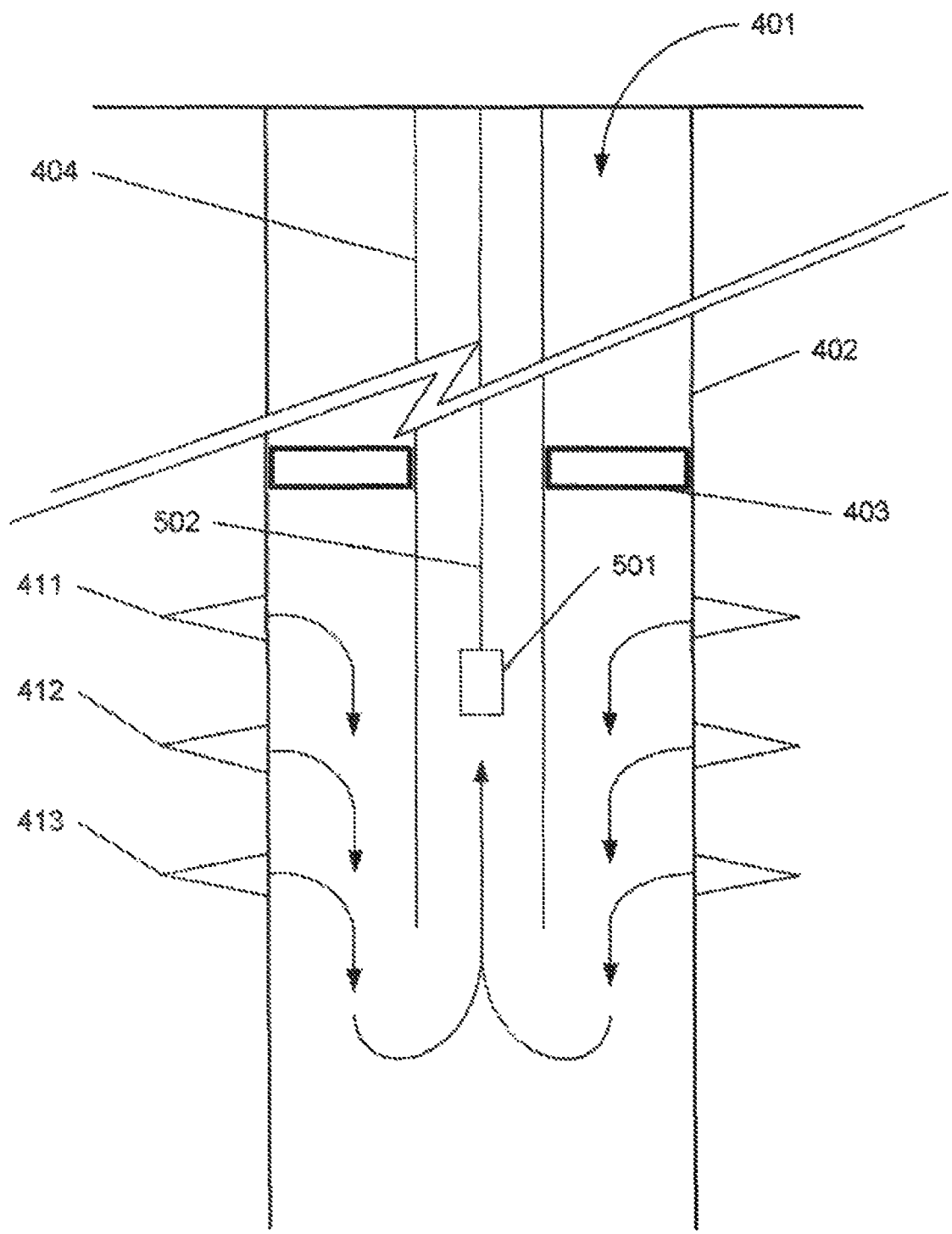
FIG. 5A shows a cross section of a well with a pulsed neutron logging tool disposed within the velocity string.

FIG. 5A shows a cross section of a well 401 with a pulsed neutron logging tool 501 is suspended from a wireline 502 and positioned within the velocity string 404. The inflow from each of the production zones 411, 412, 413 flows downwardly to the end of the velocity string 404, then the composite flow travels up the velocity string 404. A packer 403 forces the production fluids from the production zones 411, 412, 413 to flow into the velocity string 404. It is noted that a packer may not be necessary if the hydrostatic pressure in the annulus between the velocity string 404 and the casing 402 is high enough to prevent the production fluids from flowing upwardly in the annulus or if upward migration of the produced fluids in the annulus is prevented in some other manner, such as no flow permitted from the annulus at the surface by closing the annular valves.

The pulsed neutron logging tool 501, as will be described, may be used to measure the inelastic count rate of the fluids in the annulus between the velocity string 404 and the casing 402, as well as the water velocity in the fluid flow. Based on this information, collected at a plurality of positions, the inflow performance of each production zone 411, 412, 413 may be estimated.

Use of a pulsed neutron logging tool requires that there is at least some water in the fluid flow to be analyzed. This requirement is easily met. Even if there is not any water in the produced fluid stream, a low-rate pump may be used to introduce a small amount of water into the fluid flow, as is known in the art.

FIG. 5A, the pulsed neutron logging tool 501 is shown positioned between production zones 411 and 412. In this position, the inelastic count rate and water velocity measurements will represent the flow in the annulus between these production zones 411, 412. Because these are the two uppermost zones, the measurements made at the position shown in FIG. 5A will represent the inflow performance of the first production zone 411.

Figure 5B:
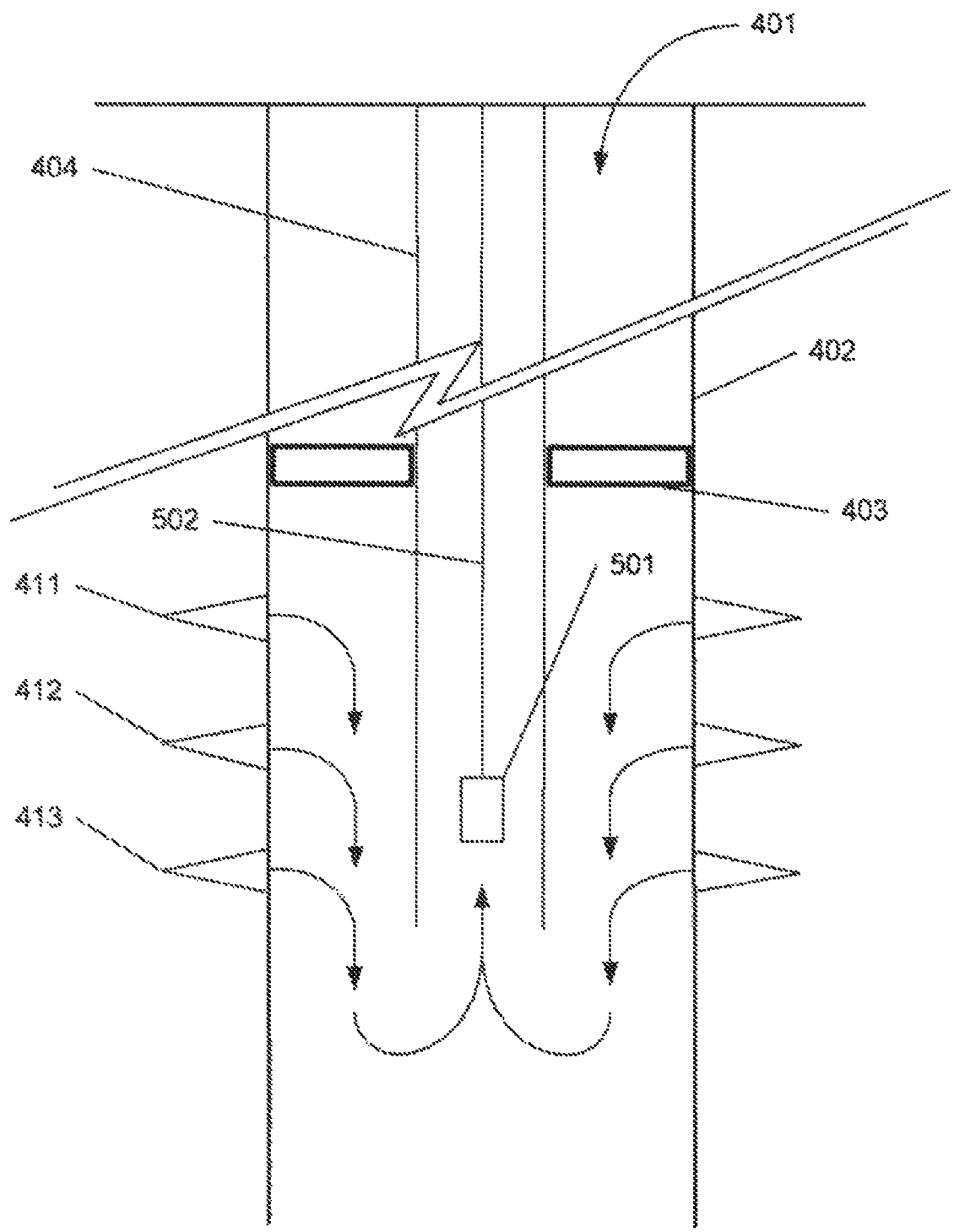
FIG. 5B shows a cross section of a well with a pulsed neutron logging tool disposed within the velocity string.

FIG. 5B shows the same well 401 as in FIG. 5A, but with the neutron logging tool 501 positioned between the second and third production zones 412, 413. In this position, the measurements will represent a composite flow of the inflow from both the first and second production zones 411, 412. The inflow performance of the second production zone 412 may be determined by subtracting the data collected relating to only the first production zone 411. Similar measurements and calculations may be performed over the vertical depth of the well 401 and between each of the production zones. Wells with more than two or three production zones may also be characterized in this manner, possibly requiring more measurements to characterize the additional zones. In some cases, the data collected from a pulsed neutron production log are used in a complete production systems analysis computational model to determine the fluid flow characteristics at a plurality of points in the well. The inflow performance may be determined from the model.

Figure 6:
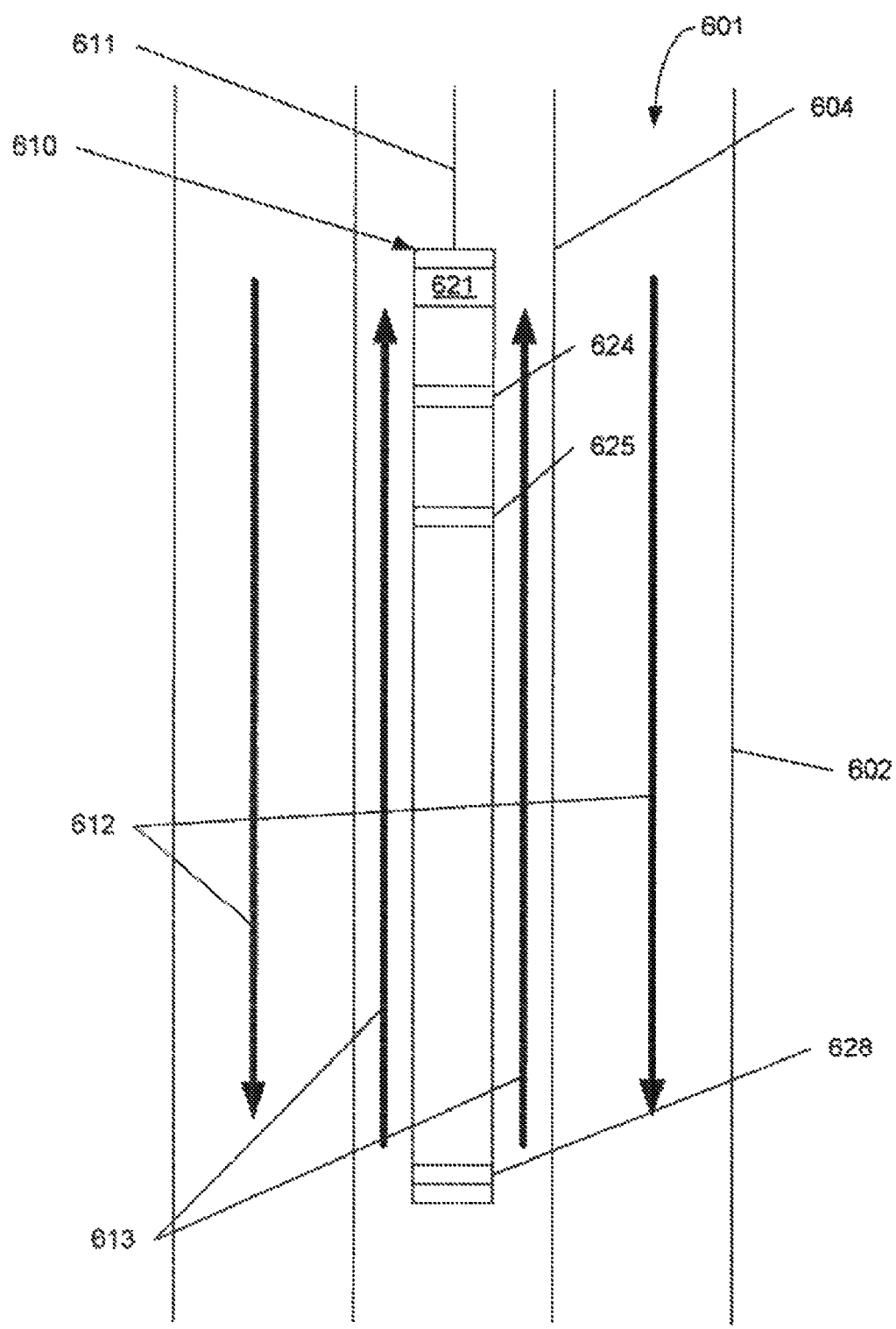
FIG. 6 shows a cross section of an example of a downhole tool that includes a pulsed neutron logging tool.

Reference will be made to FIG. 6 to describe the neutron interactions and detector arrangements. FIG. 6 shows a schematic of a downhole hole 610 that is configured to operate as a pulsed neutron logging tool. The downhole tool 610 is positioned in velocity tubing 604 in a well 601. Production fluids, which may be a gas, a liquid, or both, flow downwardly through the annulus between the velocity tubing 604 and the casing 602, shown by the downward flow arrows 612. Inside the velocity tubing 604, the production fluids flow in an upward direction, shown by upward flow arrows 613. As noted above, the invention is not limited to velocity tubing. This is provided only as an example.

The flow 613 on the inside of the velocity tubing 604 may be a composite flow from all of the production zones in a multilayer reservoir. The flow 612 in the annulus of the well 601 may be comprised of the inflow from one or more of the production zones in a multilayer reservoir, depending on the position of the downhole tool 610 relative to the production zones, as discussed above with reference to FIGS. 5A and 5B. In addition, it is noted that even though this discussion references upward and downward flow, a downhole tool may be located in a horizontal or deviated well. The same principles will apply to a horizontally positioned tool, and the invention is not limited by the orientation of the tool and well. Up and down are used in this disclosure for convenience. Also, a pulsed neutron logging tool may be used to measure the properties of an upward flow. For example, production fluids generally flow upward in a tubing. In an injection well, the injection flow may flow downward through a tubing, but upward in the annulus. Other flow scenarios will be explained later.

The downward tool 610, configured to operate as a pulsed neutron logging tool, is shown as a rough schematic diagram. Pulsed neutron logging tools are known in the art. Generally, a downhole tool is a modular tool that may include any number of sensors and detectors for a particular downhole application. In order to perform pulsed neutron logging functions, a downhole tool may include a pulsed neutron generator 621 along with appropriate gamma ray sensors 624, 625, 628. Such a tool 610 may also be configured to perform in a number of different modes to gather different types of information. The gamma ray sensors 624, 625, 628 may also be used for different functions within the downhole tool, such as gamma ray spectroscopy. A pulsed neutron logging tool may be a downhole tool operating in a pulsed neutron logging mode. It is noted that the downhole tool 610 in FIG. 6 is large relative to the components that serve the pulsed neutron logging functions. This is because, as stated above, a typical down hole tool is modular and will include other components for other logging functions.

The downhole tool 610 shown in FIG. 6 includes a pulsed neutron generator 621 and several gamma ray detector 624, 625, 628. The first two detectors 624, 625 typically are called the near detector 624 and the far detector 625. In a typical tool, the near detector 624 is located less than 1 foot from the pulsed neutron generator 621, and the far detector is located on the order of about 2 feet away from the pulsed neutron generator 621. The gamma ray detector 628 is located farther away from the pulsed neutron source 621. Depending on the application, it may be located 20 feet from the pulsed neutron generator, or more. The third detector 628 may be a gamma ray detector that is typically used for other tool functions, but is able to operate in conjunction with the pulsed neutron logging tool functions for purposes of determining the inflow performance of the production zones in a multilayer reservoir. In other cases, the third gamma ray sensor 628 may be positioned in the tool specifically for purposes of determining the inflow performance of the production zones in a multilayer reservoir.

One possible type of pulsed neutron generator is a particle accelerator that may be energized when a pulse of neutrons is desired. Such a neutron generator is generally not directional, meaning that the neutrons are emitted spherically in all directions. The gamma ray sensors are also non-directional sensors positioned to detect gamma rays coming from all directions. Other types of pulsed neutron generators and gamma ray sensors may be used.

In one example, a pulsed neutron logging tool may be used to determine the inelastic count rate, which provides an indication of the gas and liquid fractions in the flow stream. The inelastic count rate may be determined by pulsing the pulsed neutron generator 610 and sensing the gamma rays that result from inelastic collisions between the neutrons and nuclei of atoms. Generally, the gamma rays from inelastic collisions are sensed in the first several milliseconds after the pulse. In that time period, the neutrons are generally still fast neutrons because they have not had enough time to slow down to the point where neutron capture is significant. In one example, the inelastic count rate is determined from measurements by the far gamma ray detectors 625.

The inelastic count rate and the liquid holdup may be determined from the gamma ray data using any means known in the art. For example, the liquid holdup in the flow stream may be directly computed from the inelastic count rate ($I_{rat}$) values recorded in a pulsed neutron log. The minimum and maximum inelastic count rate values represent the case where the fluid is 100% water ($I_{ratw}$) and 100% gas ($I_{ratg}$), respectively. These set points may be established by an interpretation engineer. The minimum set point for the analysis ($I_{ratw}$) can often be readily obtained if there is a standing water column in the well, such as at the bottom of the well below the deepest completed interval. The maximum set point ($I_{ratg}$) is generally more difficult to estimate, except in cases where the well production rate is sufficiently low enough that the well stream liquid falls back and essentially single phase gas is produced from the well at the surface. In such cases, the 100% gas point in the well flow stream can be observed in the log response. In most all other cases, the maximum set point ($I_{ratg}$) must be reasonably estimated by an interpretation engineer.

With the minimum ($I_{ratw}$) and maximum ($I_{ratg}$) set points established for the inelastic count rate analysis, the liquid holdup in the well ($Y_2$) may be computed directly from the recorded inelastic count rate values at the logged depths ($I_{rat}(z)$) in the well using the relationship given in Equation 1:

$$Y_w(z) = \frac{I_{ratg} - I_{rat}(z)}{I_{ratg} - I_{ratw}} \qquad \text{Eq. 1}$$

The relationship in Equation 1 is only one example of a relationship that may be used to determine the liquid holdup based on the inelastic count rate. Other relationships may be used.

The "liquid holdup" is the fraction of liquid that is present in an interval of pipe or casing. Because the liquid and gas in a multiphase flow will have different densities and viscosities, the different fluids will flow at different velocities, with the heavier or more viscous liquid phase moving slower, or being held up more.

In one example, a pulsed neutron logging tool may be used to determine the velocity of water flowing in the production fluid. This process will be explained using the downhole tool 610 in FIG. 6 as a reference. The pulsed neutron generator 621 is pulsed, and neutrons are incident on the fluid near the pulsed neutron generator 621. The neutrons will collide with nuclei in the fluid in an inelastic collision. Some of the energy from the neutron will be imparted to the nuclei. Collisions of neutrons with oxygen nuclei will cause a transmutation reaction. The neutron and an oxygen-16 nucleus collide to form a nitrogen-16 nucleus and a proton. This is called oxygen activation, because the stable oxygen nucleus is transmitted in to a different, radioactive nucleus. The general reaction equation is shown in Equation 2:

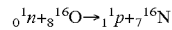

$$_0^1n + {_8^{16}}O \rightarrow {_1^1}p + {_7^{16}}N \qquad \text{Eq. 2}$$

Nitrogen-16 has a half-life of 7.13 seconds, and when it decays, nitrogen-16 will most often decay by beta emission, whereby the nitrogen-16 nucleus emits a beta particle to become an oxygen-16 nucleus. In addition, the beta decay of nitrogen-16 also yields a very high-energy gamma ray, about 6.129 MeV. The gamma ray may be detected by gamma ray detectors.

Figure 7A:
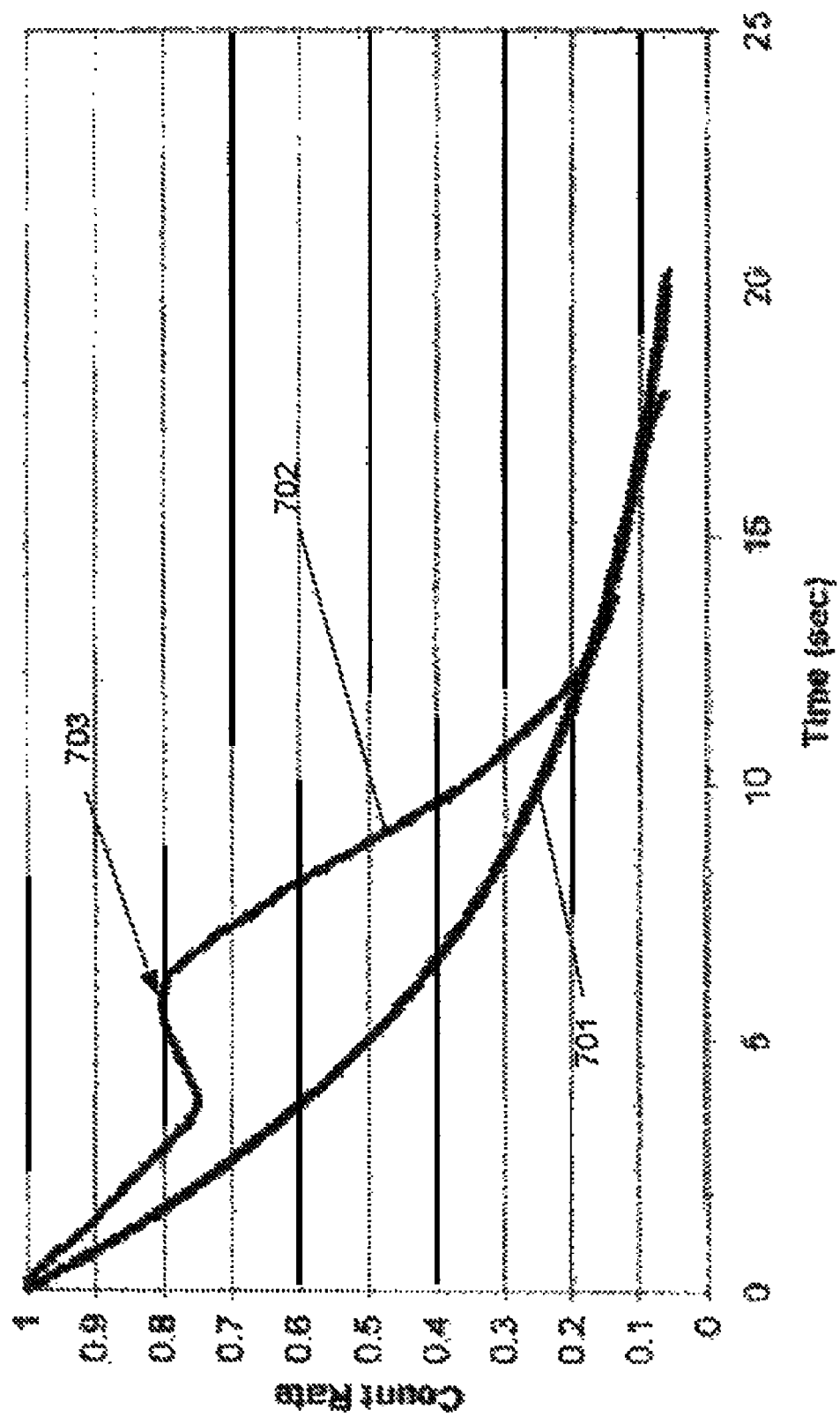
FIG. 7A shows a graph of the predicted count rate measurement from activated oxygen versus an actual count rate for flowing activated oxygen.
Figure 7B:
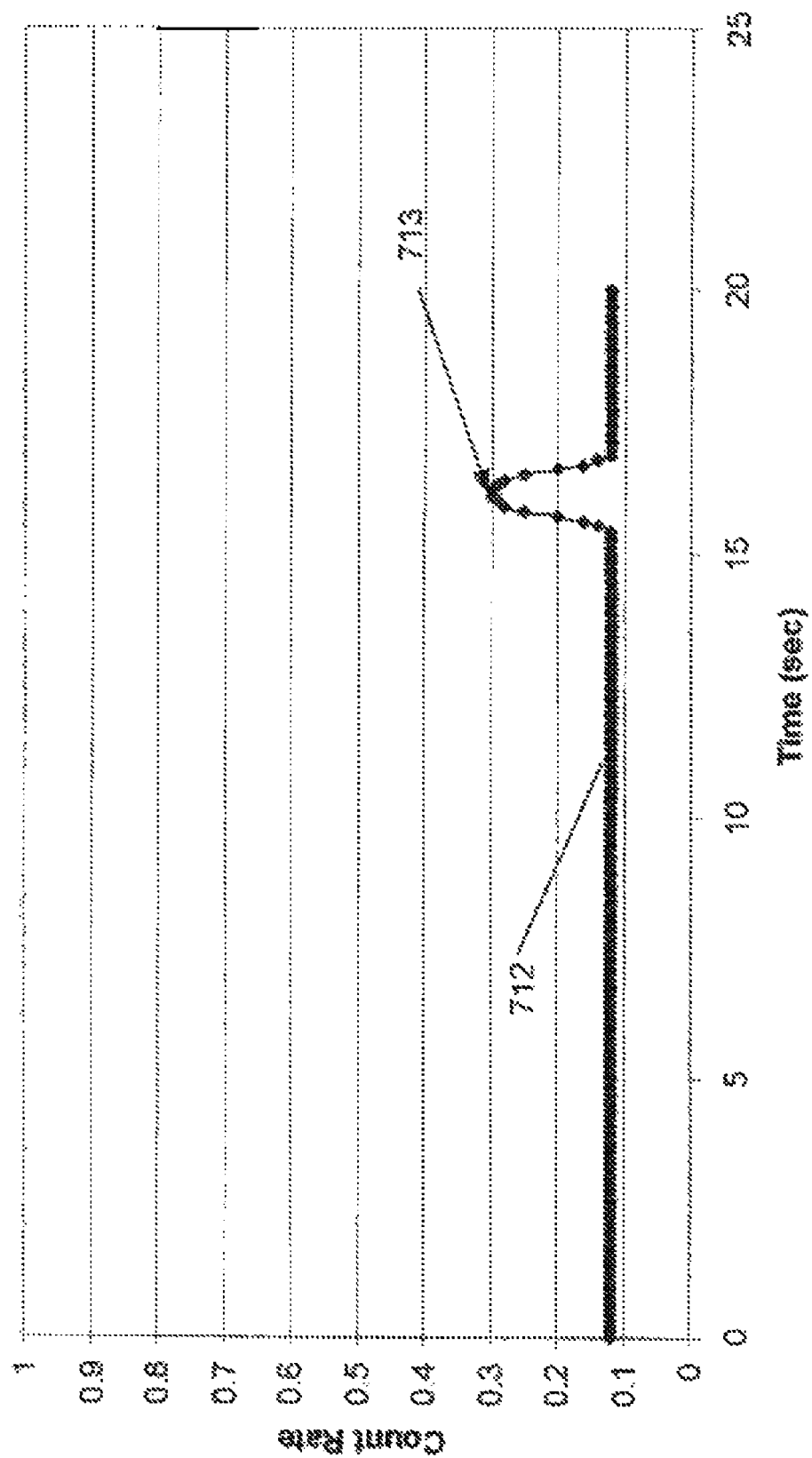
FIG. 7B shows a graph of an actual count rate for activated oxygen.

FIGS. 7A and 7B include graphs that illustrate how the oxygen activation may be used to determine the velocity of water in the production fluid flow. The graph in FIG. 7A includes a line 701 representing one example of the normalized predicted number of gamma rays that will be detected at the far sensor (625 in FIG. 6) as a result of oxygen activation versus time, if the fluid is not moving. The predicted number of counts decays exponentially as the nitrogen-16 decays away. The second line 702 represents one example of the actual counts that are detected by the far sensor. The second line 702 rises above the predicted line 701 because the activated water is moving towards the sensor, and the counts will increase according to the inverse square law. At the point 703, the detected number of counts reaches a local maximum. Following that, the second line 702 falls quickly eventually falling below the predicted line 701.

The local maximum count rate 703 observed in the second line 702 represents the point where the activated oxygen (i.e., the nitrogen-16) is closest to the far detector. In FIG. 7A, that occurs at approximately 8 seconds after the pulse, which is taken to be at time 0. In order to determine the velocity, the distance between the far detector 625 and the pulsed neutron source 621 is divided by the time to the maximum—the time it took the activated oxygen to travel the distance between the pulsed neutron source 621 and the far detector 625.

FIG. 7B shows another example of an actual count rate 712 based on the third gamma ray detector 628 in FIG. 6. The local peak 713 in the actual count rate 712 occurs at about 17 seconds after the pulse. Because the third detector 628 is located so far from the pulsed neutron generator, the count rate is largely flat, reflecting only background gamma rays, until the activated oxygen approaches the detector 628. At that time, the local peak 713 is observed. Again, the distance between the pulsed neutron generator 621 and the third detector 628 is divided by the time for the activated oxygen to flow that distance.

Using two detectors, such as the far detector 625 and the third detector 628 in FIG. 6, to measure the velocity of the water in the production fluid has at least two possible advantages. First, the two detectors serve as a redundant measurement of the velocity, thereby increasing the confidence in the measurement. Second, the two detectors 625, 628 enable the tool 610 to measure a wide range of velocities. For example, in a slow moving fluid, the nitrogen-16 may decay before the fluid reaches the third detector 628. On the other hand, in a fast moving fluid, the nitrogen-16 may pass the far detector 625 so quickly after the pulse that an accurate measurement cannot be made. By using both detectors 625, 628, the tool 610 may be configured so that the detectors in the tool enable accurate measurements of water velocity over a large range of velocities.

Measurement of water velocity using a pulsed neutron logging tool requires that the gamma ray detectors be downstream of the pulsed neutron generator. In the case where the tool is positioned in a tubing string to measure flow in the annulus, the activation of water in the tubular flow will not affect the measurement because the activated oxygen in the tubular flow will move away from the gamma ray detectors. For upward flow measurements, a neutron logging tool must be arranged differently than shown in FIG. 6. For upward flow, the tool 610 should be oriented with the gamma ray detectors 624, 625, 628 above the pulsed neutron generator 621.

Using a pulsed neutron logging tool to measure the water velocity and liquid holdup in production fluid flow between production zones in a multilayer reservoir may enable the determination of the inflow performance of one or more of the production zones, even when a velocity tubing is positioned with its lower end below the production zone.

A reliable and accurate production log analysis, as well as an evaluation of the inflow profile of multiple completed intervals in a commingled reservoir system, can be performed using the water velocity and inelastic count rate measurements from a pulsed neutron log in combination with industry accepted production systems analysis pressure traverse computational techniques for multiphase flow in a well.

The water velocity required for the analysis of the inflow from each of the completed intervals in the well begins by the computation of the water velocity moving past the pulsed neutron logging tool, as described above. The computed water velocity must account for the effect of the logging tool in the well. In the case where the water velocity being measure is in the annulus between the tubing and casing, no correction is required. Where the water velocity being considered is the result of tubular flow (i.e., flow and tool are in the tubing or both are in the casing below the end of the tubing), however, the velocity reported by the typical water flow log analysis must be corrected to reflect the well bore water velocities in the absence of the logging tool. This may be accomplished using Equation 3:

$$v_{wc} = v_{wl} \frac{A_{pt}}{A_P} \quad \text{Eq. 3}$$

where:
- $v_{wc}$=corrected in situ water velocity
- $v_{wl}$=log-reported water velocity
- $A_{pt}$=hydraulic area around tool
- $A_p$=cross sectional area of tubular or casing The cross sectional area for flow that is used in most production systems analysis computations are based on the hydraulic or effective diameter concept for fluid flow in an annulus. The area for tubular flow in casing below the end of a tubing string, or in a tubing string ($A_p$) is shown in Equation 4, where the area in units of square feet and the inside diameter of the tubular is in units of inches:

$$A_p = 0.005454\, D^2 \quad \text{Eq. 4}$$

The hydraulic area to flow in the annulus between the casing or tubing and the pulsed neutron logging tool for which the log analysis reported water velocities are given is presented in Equation 5, where $d_g$ is equal to (D-d), and d represents the outside diameter of the pulsed neutron logging tool and D represents the inside diameter of the casing or large tubing, where the area is in units of square feet and the inside diameter of the tubular is in units of inches:

$$A_{pt} = 0.005454\, d_e^2 \quad \text{Eq. 5}$$

Other formulations of an annular flow equivalent pipe diameter may be used in connection with the present invention. One formulation may be derived from the concept of an equivalent radius for pipe flow that will result in the same pressure loss at the actual annular flow configuration under laminar flow conditions. One example of such a formulation is given in Equation 6:

$$d_e = \sqrt{D^2 + d^2 - \frac{D^2 - d^2}{\ln\left(\frac{D}{d}\right)}} \quad \text{Eq. 6}$$

Another expression for the equivalent annular flow pipe diameter results from the slot flow approximation. The flow in the annulus is approximated as the flow between two infinite parallel plates. An example of this type of approximation is given in Equation 7:

$$d_e = \sqrt{\frac{2}{3}(D - d)} \quad \text{Eq. 7}$$

Equation 8 may be used to compute the average velocity of the fluid flow in the annulus around the logging tool, where the average velocity is in feet per second, the in situ flow rate is in cubic feet per second, and the equivalent diameter is in inches:

$$\bar{v} = \frac{183.35 q}{d_e^2} \quad \text{Eq. 8}$$

where
q=in situ flow rate.

An alternate annular flow equivalent pipe diameter relationship may be used for computing the production systems analysis pressure traverse. The relationship in Equation 9 has been derived empirically using the production performance data of hydraulically fractured wells.

$$d_e = \frac{\sqrt[4]{D^4 - d^4 - \frac{(D^2 - d^2)^2}{\ln\left(\frac{D}{d}\right)}} + \sqrt{D^2 - d^2}}{2} \quad \text{Eq. 9}$$

When the equivalent pipe diameter relationship in Equation 9 is used for annular flow computations using tubular flow relationships, the equivalent diameter ($d_e$) may be used to compute a fictitious velocity (v*) that may be used in production systems analysis pressure traverse computations. One example of a relationship that defines a fictitious velocity is provided in Equation 10, where the average velocity is in feet per second, the in situ flow rate is in cubic feet per second, and the equivalent diameter is in inches:

$$v^* = \frac{183.35 q}{d_e^2} \quad \text{Eq. 10}$$

In order to get a more complete analysis of the multiphase flow system, it may be necessary to evaluate the interrelationships between liquid holdup, slip velocity, and the individual in situ fluid phase flow rates. The slip velocity is the difference between the average gas velocity and the average liquid velocity. The pressure traverse and multiphase flow correlations of Hagedorn and Brown, Duns and Ros, Orkiszewski, Beggs and Brill, Cullender and Smith, or various other multiphase flow pressure traverse correlations of interest may be used to analyze the multiphase flow system. For example, the Duns and Ros technique established a fundamental relationship for multiphase flow between the slip velocity, the in situ gas velocity, the in situ liquid velocity, and the liquid holdup. That relationship is shown in Equation 11a.

$$v_s = \frac{v_{sg}}{1-Y_w} - \frac{v_{sl}}{Y_w} \quad \text{Eq. 11a}$$

$$v_g = \frac{v_{sg}}{1-Y_w} \quad \text{Eq. 11b}$$

$$v_l = \frac{v_{sl}}{Y_w} \quad \text{Eq. 11c}$$

where:
$v_s$=slip velocity
$v_{sg}$=in situ superficial gas velocity
$v_{sl}$=in situ superficial liquid velocity
$v_g$=in situ average gas velocity
$v_l$=in situ average liquid velocity
$Y_M$=liquid holdup As shown in Equations 11b and 11c, the in situ average liquid velocity may be calculated by dividing the in situ superficial liquid velocity by the liquid holdup. Likewise, the in situ average gas phase velocity may be calculated by dividing the in situ superficial gas phase velocity by one minus the liquid holdup. In this disclosure, the term "in situ gas phase velocity" is used generically to mean either the in situ average gas phase velocity or the in situ superficial gas phase velocity because one may be calculated if the other is known. Similarly, the term "in situ liquid phase velocity" is used generically to mean either the in situ average liquid phase velocity or the in situ superficial liquid phase velocity.

The above discussed examples include determining the liquid holdup ($Y_w$) and the superficial velocity of water in the fluid flow stream ($v_{sl}$). Even with these data, Equation 11a still includes two unknowns, the in situ superficial gas velocity and the slip velocity. Both of these quantities are linked to the dimensional oil, gas, and water flow rates in the multiphase flow regime. A similar slip velocity relationship is also used between the oil and water phases in a three phase (oil, gas, and water) system analysis. In both slip velocity relationships (gas-liquid and oil-water), the slip velocity denoted by the particular relationship is the difference between the average velocity of the less dense phase and the more dense fluid phase. There are at least two options for solving for these variables.

One option that may be used is the implementation of a root-solving solution procedure to solve for the unknown in situ gas velocity that would satisfy the multiphase fluid flow relationships and result in a liquid holdup value that is comparable to that determined from the inelastic count rate of the Pulsed Neutron log measurements, for an assumed slip velocity. This technique has been found to work reasonably well for only the Duns and Ros multiphase flow correlation in practice since there are specific liquid holdup and slip velocity relationships for each flow regime.

Another technique that may be used is an inverse interpolation. A series of forward solutions are computed with the previously determined multiphase pressure traverse, liquid holdup, and slip velocity correlations for a range of assumed gas flow rates and previously determined liquid flow rates and liquid holdup. A comparison is made not only of the computed liquid holdup values obtained, but also of the identification of the corresponding flow regime and slip velocity. The implementation of this type of in situ gas velocity and slip velocity evaluation procedure may be complex, but does result in a stable, reliable, and accurate solution procedure for simultaneously evaluating the in situ gas velocity and corresponding slip velocity.

A pulsed neutron log analysis, as described above, coupled with measured well pressures and temperatures, may be used to produce a reasonably direct production log evaluation of the multiphase flow in the well and inflow contributions of the individual completed intervals in the well. Most modern downhole tool assemblies include temperature and pressure sensors, enabling an independent verification of the conventional production log response. The verification may also be used to aid in the interpretation of conventional production log analyses where there are complexities, such as converging flow at the bottom of the tubing string or slug flow conditions.

Figure 8:
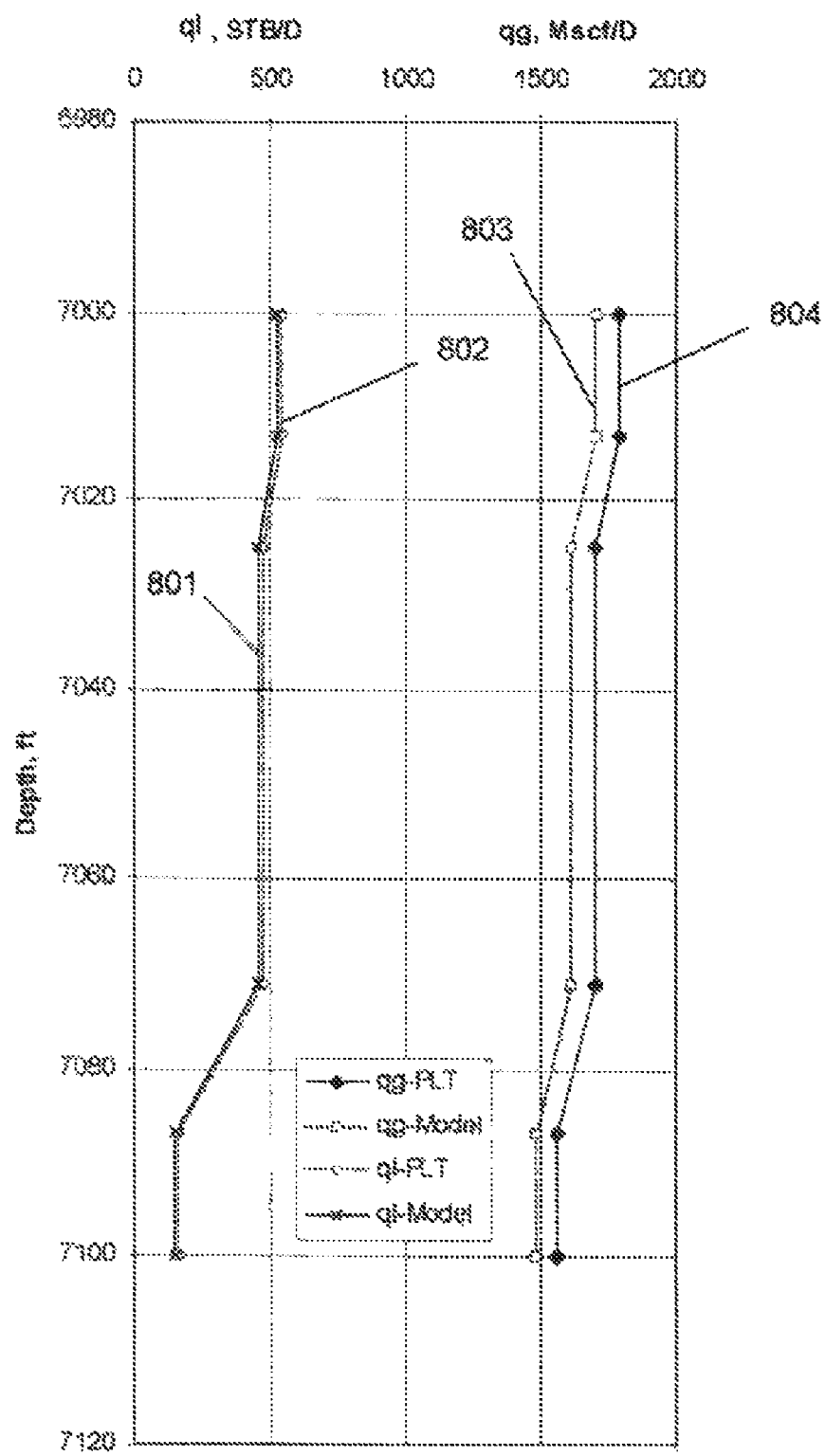
FIG. 8 shows a graph comparing results from a pulsed neutron log analysis and from conventional production log analysis.

FIG. 8 shows a graph of data collected for a field well that shows the applicability and accuracy of pulsed neutron log inflow analysis. In this well, the end of the tubing is at a point above all of the completed intervals, thus permitting the use of a conventional production log as well as the pulsed neutron logging technique. A conventional production log with spinner, pressure and temperature probes was run, as well as an optical scanner to record the bubble counts in the flow stream. Multiple passes were made with the conventional production logging system, both with and against the direction of flow (uphill in this case).

Only a short distance existed between the end of the tubing string and the top of the shallowest completed interval in the well, and some convergence effects are seen in the conventional production log response of the well, increasing the difficulty in its interpretation, as well as some slugging effects in the production log response in the well. These complicating effects in the conventional production log analysis also help to demonstrate the advantage of using the pulsed neutron production log analysis to qualify reliable well bore liquid velocities and liquid holdup values in the analysis.

A pulsed neutron logging run was also made in which the neutron captures recorded with the log were used to determine the inelastic count rate values. Water flow measurement stations were also taken above, across, and below the shallowest two completed intervals in the well to detect water movement in the well. There were four valid measurements of water movement detected at the stations that could be used in the analysis. A summary of the water flow velocities computed and reported in the water flow log analysis is presented in Table 1.

TABLE 1

Water Flow Measurements

| Station | Position | Water Velocity (ft./min.) |
|---|---|---|
| 1 | Across Zone 1 | 72.7 |
| 2 | Between Zones 1 & 2 | 68.3 |
| 3 | Across Zone 2 | 53.7 |
| 4 | Below Zone 2 | 51.2 |

Tables 2 and 3 present a comparison of the computed inflow performance of the upper two completed intervals in the well using conventional production log analysis, as well as the resulting computed inflow profiles for these zones with the pulsed neutron log analysis. Note that there is good agreement between the two interpretation methods for both the gas and liquid inflow with the two analysis techniques. A comparison of the wellbore flow profiles evaluated using the two production logging techniques is presented in FIG. 8.

TABLE 2

Conventional PLT Analysis

| Interval | Gas Flow (Mscf/D) | Pct. of Total | Liquid Flow (STB/D) | Pct. of Total |
|---|---|---|---|---|
| 1 | 90.8 | 5.1% | 66.8 | 12.3% |
| 2 | 136.5 | 7.6% | 323.7 | 59.4% |
| 3–5 | 1562.2 | 87.3% | 154.3 | 28.4% |

TABLE 3

Pulsed Neutron PLT Analysis

| Interval | Gas Flow (Mscf/D) | Pct. of Total | Liquid Flow (STB/D) | Pct. of Total |
|---|---|---|---|---|
| 1 | 85.3 | 5.0% | 65.8 | 12.6% |
| 2 | 134.5 | 7.9% | 308.5 | 59.1% |
| 3–5 | 1482.4 | 87.1% | 147.7 | 28.3% |

The left-hand side of the graph in FIG. 8 shows the liquid flow rate, in stock tank barrels per day, as obtained with the pulsed log analysis 801 and by conventional production log analysis 802. As shown in the graph, the two lines 801, 802 are in very close agreement. The right-hand side of the graph in FIG. 8 shows the gas flow rate, in thousands of standard cubic feet per day, as obtained with the pulsed neutron log analysis 803 and by the means of a conventional production log analysis 804. As shown in the graph, the two lines 803, 804 are in very close agreement.

In fact, the pulsed neutron production log analysis results in better agreement with the measured gas production rate at the surface (1.7 MMscf/D) during the logging operations than was obtained with the conventional production log analysis (1.8 MMscf/D). Besides the problem previously stated regarding the flow convergence at the bottom of the tubing string, there was also a significant amount of slug flow evidenced in the production log behavior. Both the conventional measurement and pulsed neutron log analyses identified the flow regime over this interval of the well as being in the slug flow regime.

Figure 9:
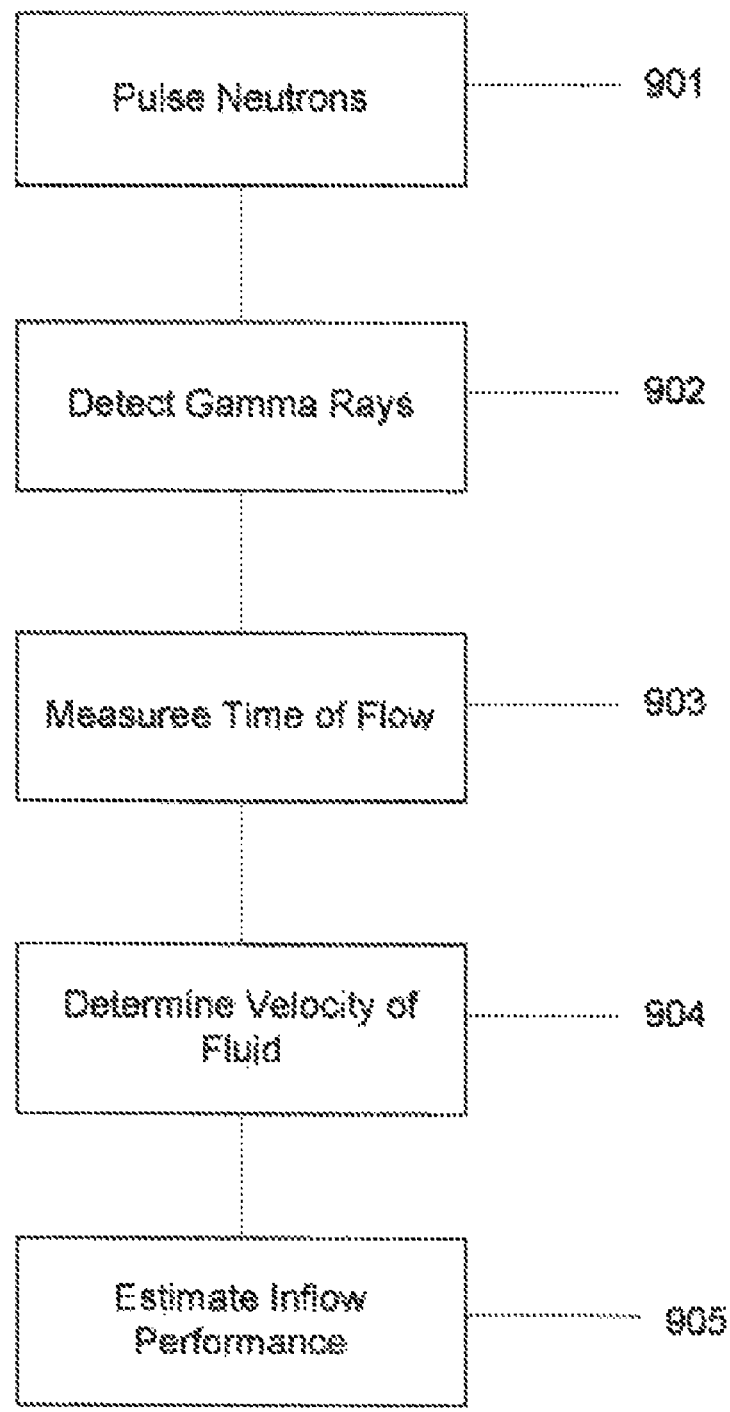
FIG. 9 shows one example of a method for evaluating inflow performance for completed intervals in a well.

FIG. 9 shows one example of a method for determining an inflow performance for completed intervals in a well. The method first includes pulsing neutrons into a fluid flow in the wellbore, at step 901. In at least one example, the well fluid is production fluid flowing downwardly in an annulus. The well fluid flow may be any type of well fluid flow, including the examples described above. Next, the method may include detecting gamma rays from the decay of nitrogen-16 in the well fluid, at step 902. The neutron pulse will activate oxygen in the well fluid to form an amount of nitrogen-16. The decay of nitrogen-16 produces a gamma ray that may be detected by gamma ray detectors.

The method may include determining the velocity of the water in the well fluid. This is shown generally at steps 903 and 904. This may be performed in a single step by processor. In another example, determining the velocity of water in the fluid includes measuring the time that it takes for the activated oxygen to flow from the pulsed neutron generator to the gamma ray detector, at step 903. In one example, the time is determined from a local maximum in the count rate at the detector. Determining the fluid velocity may then be accomplished by dividing the distance between the pulsed neutron generator and the gamma ray detector, at step 904.

Finally, the method may include estimating the inflow performance of one or more completed intervals in the well from data that includes the in situ water velocity, at step 905. This step may include using one of the various multiphase flow correlations known in the art, along with other data collected by sensors in the wellbore. This may include evaluating other flow properties, such as the in situ gas velocity, the slip velocity, the wellbore pressure and fluid mixture densities. These properties may be used in a comprehensive production systems analysis computational model to determine the quantities at a plurality of locations in the wellbore, tubing string, and annulus between the casing and the tubing string. The wellbore fluid velocities, fluid mixture densities, and pressures at a plurality of locations in the wellbore, annulus, and tubing string are used to determine the inflow rates of fluid from or into each of the completed intervals for production zones encountered by the wellbore.

It is noted that the method may be used using more than one gamma ray detector. The data from the detectors may be combined in any manner known in the art to determine the velocity of the water. For example, the data may be averaged.

It is also noted that "inflow" is used to mean flow in any direction from a completed interval. In cases of injection or for a thief zone, the inflow may be flow from the well into the completed interval. The term inflow does not exclude such situations.

Figure 10:
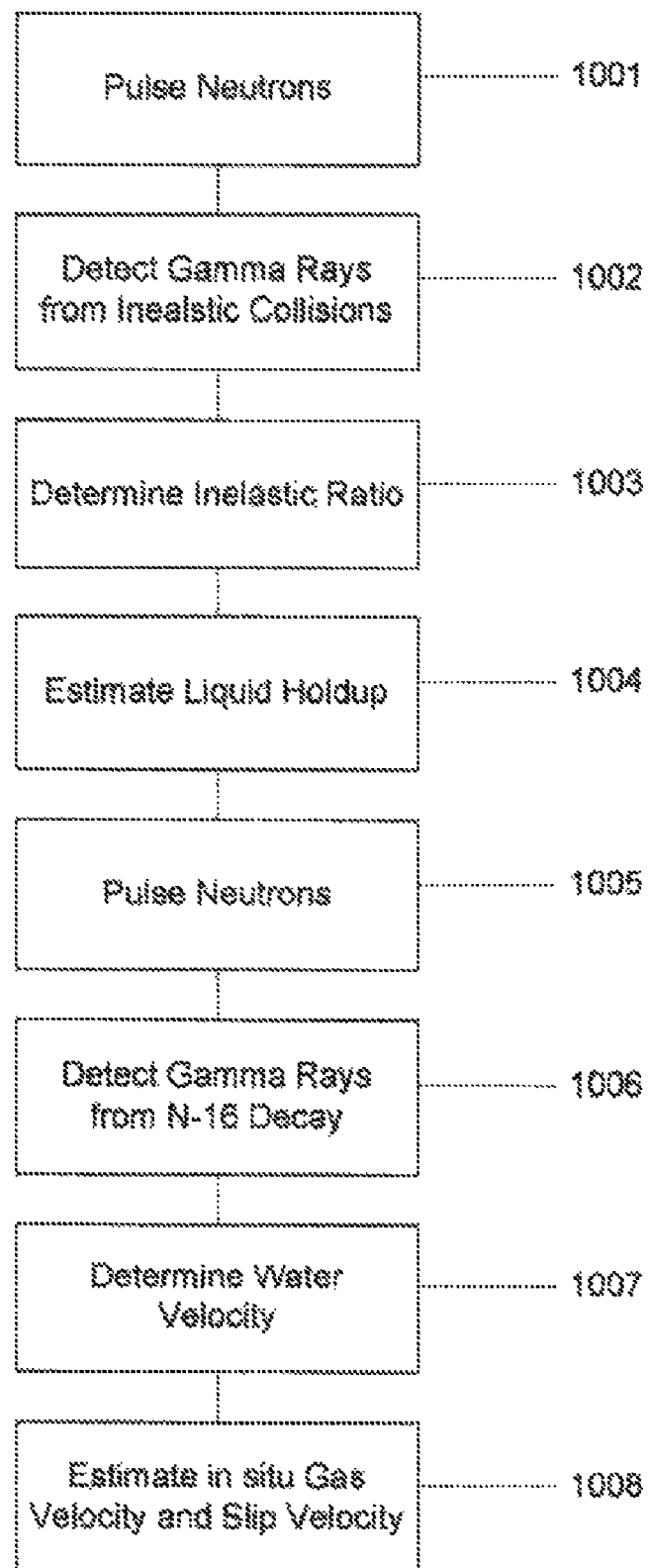
FIG. 10 shows one example of a method for profiling multiphase production flow in a well.

FIG. 10 shows a method for profiling multiphase fluid flow in a well. The method may include pulsing a first pulse of neutrons into the fluid flow, at step 1001. Next, the method may include detecting gamma rays produced from inelastic collisions between the neutrons and nuclei in the production flow, at step 1002. The gamma rays from inelastic collisions may be detected within the first few milliseconds following the first neutron pulse.

The method may then include determining the inelastic count rate of the fluid from the detected gamma rays, at step 1003. The flux and energy of the gamma rays is related to the inelastic count rate. The method may then include determining the liquid holdup of the fluid, at step 1004. In one example, estimating the liquid holdup is performed using Equation 1.

The method may include pulsing a second pulse of neutrons into the well fluid flow, at step 1005. In at least one example, the well fluid is production fluid flowing downwardly in an annulus. The well fluid flow may be any type of well fluid flow, including the examples described above. Next, the method may include detecting gamma rays form the decay of nitrogen-16 in the well fluid, at step 1006. The neutron pulse will activate oxygen in the well fluid to form an amount nitrogen-16. The decay of nitrogen-16 produces a gamma ray that may be detected by gamma ray detectors.

The method may include estimating the velocity of the water in the well fluid. This is shown generally at step 1007. Specific methods for estimating the water velocity were described above with respect to steps 903 and 904 in FIG. 9. The method may include estimating the in situ gas velocity and the slip velocity, at step 1008. These two quantities may be separately determined or they may be computed simultaneously using a multiphase fluid flow model. For example, the Duns and Ros correlations may be solved using an inverse interpolation or a root-solving method to determine the in situ gas velocity and the slip velocity.

It is noted that, while FIG. 10 includes a first neutron pulse and a second neutron pulse, the order of the pulses is not limited. For example, the second pulse and corresponding velocity measurements may be performed before the first pulse and the corresponding inelastic count rate determination. In addition, FIG. 10 shows a method for one particular location in a well. The method may be performed at a plurality of locations in the well so that the data may be used to resolve the inflow performance of each of a plurality of production zones in a reservoir.

Figure 11:
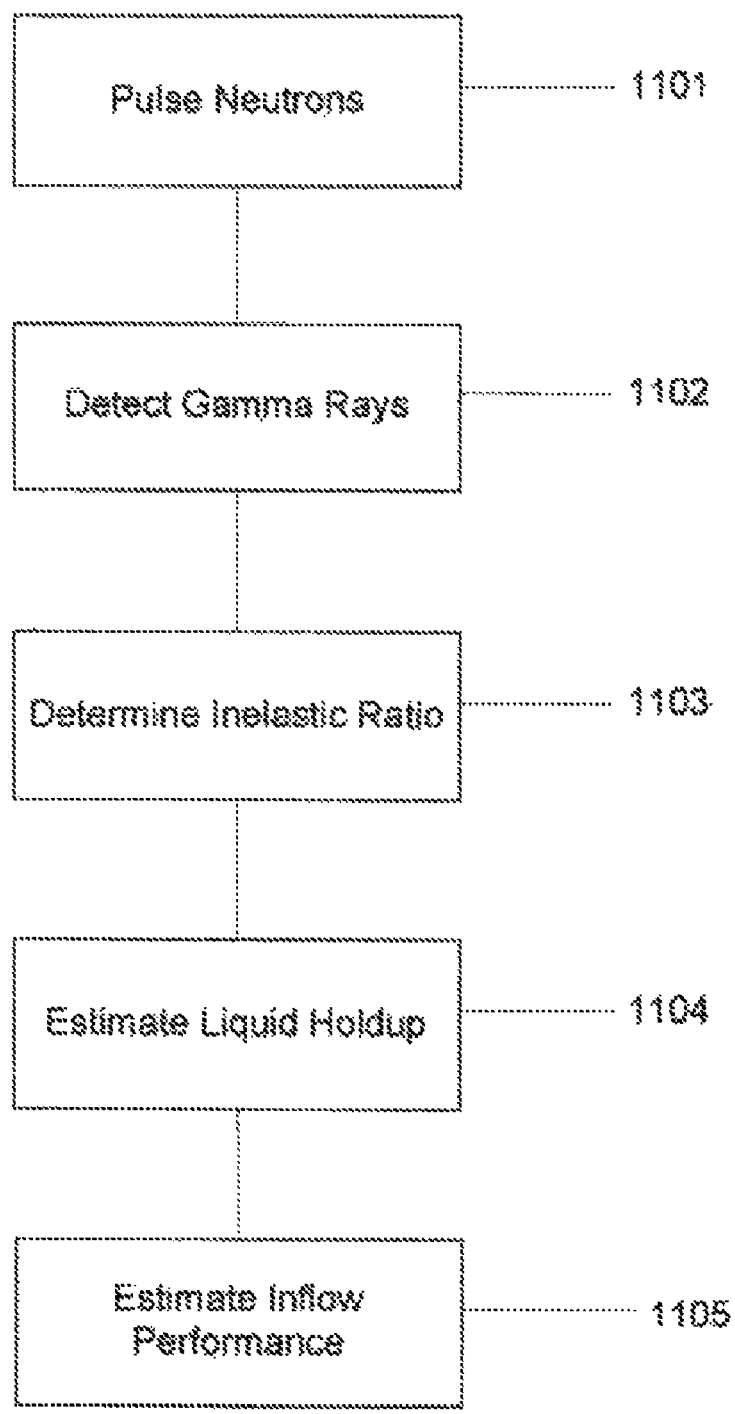
FIG. 11 shows one example of a method for evaluating inflow performance for completed intervals in a well.

FIG. 11 shows one example of a method for determining an inflow performance for completed intervals in a well. The method first includes pulsing neutrons into a fluid flow in the wellbore, at step 1101. In at least one example, the well fluid is production fluid flowing downwardly in an annulus. The fluid flow may be any type of fluid flow, including the examples described above. Next, the method may include detecting gamma rays resulting from inelastic collisions between the neutrons and nuclei in the fluid flow, at step 1102.

The method may then include determining the inelastic count rate of the fluid from the detected gamma rays, at step 1103. The flux and energy of the gamma rays is related to the inelastic count rate. The method may then include estimating the liquid holdup of the fluid, at step 1104.

Finally, the method may include estimating the inflow performance of one or more competed intervals in the well from data that includes the liquid holdup at step 1105. This may include evaluating other flow properties, such as the in situ gas velocity, the slip velocity, the wellbore pressure and fluid mixture densities. These properties may be used in a comprehensive production systems analysis computational model to determine the quantities at a plurality of locations in the wellbore, tubing string, and annulus between the casing and the tubing string.

There are a large number of well flow configurations for which a pulsed neutron log may be used for multiphase flow analysis. Among these configurations are the situations where: (1) there is production from the tubing, but the annulus is static at the surface; (2) there is production from the annulus, but the tubing is static at the surface; (3) there is production from both the tubing and annulus at the surface; (4) there is injection into the tubing and production from the annulus at the surface; (5) there is injection into the annulus and production from the tubing at the surface; (6) there is injection into the tubing, but the annulus is static at the surface; (7) there is injection into the annulus and the tubing is static at the surface; and (8) there is injection into both the tubing and annulus at the surface. In addition, pulsed neutron analysis may be useful in a flow situation where there is production from several completed intervals in a multilayer reservoir, but where at least one interval lacks the pressure to produce. The production fluids from other intervals may flow into such an interval. A "thief zone," such as this, may be identified using neutron log analysis. Neutron log analysis may present advantage in each of these different flow scenarios.

It is noted that injections relates to pumping fluids and materials from the surface into the well, and ultimately into the formation. As is known in the art, this is done for several purposes, for example, waste disposal or to charge a well. In such a case, the flow will be from the well and into the formation. Nonetheless, the term inflow is used generically to describe these situations, even though the fluid is flowing out of the well.

There are also multiple well tubular and completion scenarios for which neutron log analysis may be applicable. These include the cases of: (1) there is no tubing in the well and flow is only in the casing; (2) there is tubing in the well that is set above all of the completed intervals; (3) there is tubing in the well that is set below the top of the shallowest completed interval and above the bottom of the deepest completed interval; and (4) the tubing is set below all of the completed intervals in the well. The specification of a sealing packer can also be made in the analysis in which the packer can be above all of the completed intervals in the well or below one or more of the completed intervals. A pulsed neutron log production inflow analysis, as described, may be used with other completion scenarios as well.

The specification of a mixed direction (uphill and downhill flow) for the measured water velocity is permitted. The specification of the start and stop depths of the timing of the water (liquid) velocity measurements directly permits the proper assignment of the appropriate signs for the water velocity values specified in the analysis. The specified measured water velocity table is merged in the analysis with the specified completed intervals in the well that have been assigned to properly provide a realistic water velocity profile for interpolation in the analysis. This is particularly important in cases where there is a sparse set of water velocity measurements made in the well.

It is also possible to take water flow velocity measurements above and below each of the completed intervals in the well, except the deepest completed interval in the well, which may only require the water velocity measurement above the completed interval. The surface flow rates of each of the fluid phases may also be measured at the surface, in both the tubing and annulus (if applicable). In addition, the temperatures and pressures in the tubing and annulus pressures and temperatures may also be measured during the pulsed neutron log measurements.

In some cases, the velocity of the gas may be insufficient to entrain the liquid particles and continuously remove them from the well. In such a case, a portion of the liquid may fall back down the well and accumulate at the bottom of the well. When this occurs, the measurement of the liquid holdup may be erroneously high due to the presence of additional liquid in the well, creating an error in the estimation of the in situ gas phase velocity and the slip velocity. An appropriate correction may be required to determine the true in situ gas phase velocity.

The "critical velocity" of the gas is used in the context of this discussion is the minimum average gas velocity where the upward drag force on the largest droplets of entrained liquid is equal to the downward gravitational forces on the droplet. If the average gas velocity is super-critical, the entrained liquid will flow upwardly with the gas. If the average gas velocity is sub-critical, the liquid droplets will fall back down into the well.

The critical velocity for continuous transport of entrained liquid droplets ($v_{g,crit}$) for a particular flow may be estimated using Equation 12:

$$v_{g-crit} = \frac{1.2978[\sigma(\rho_l - \rho_g)]^{1/4}}{C_d^{1/4} \rho_g^{1/2}} \qquad \text{Eq. 12}$$

where:
 $\sigma$=Interfacial (surface) tension between the liquid and gas;
 $\rho_l$=Liquid density;
 $\rho_g$=Gas density; and
 $C_d$=Coefficient of drag.

The interfacial tension between the gas and liquid may be correlated using techniques that are known in the art. The densities of the gas and the liquid may be determined using the known density of the gas and liquid that are produced at the surface and the measured temperature and pressure at the position in the well where the flow measurements are being taken.

Figure 12:
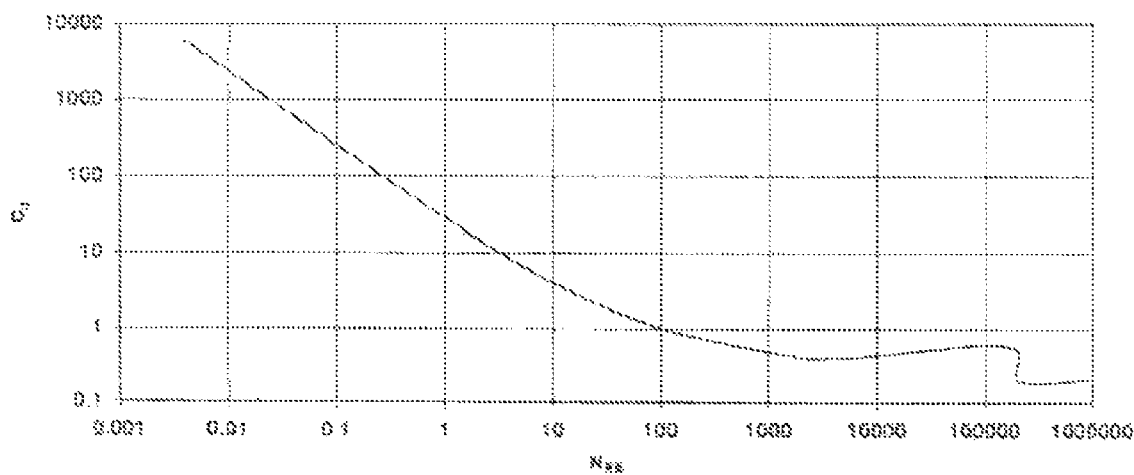
FIG. 12 shows one example of a graph of the coefficient of friction on a spherical liquid particle based on the Reynolds number.

The drag coefficient ($C_d$) may be estimated by the Reynolds number. FIG. 12 shows a graph of the drag coefficient of spherical particles as a function of the Reynolds number ($N_{RE}$). Equation 13, below, are stepwise continuous functions that are fitted to the graph in FIG. 12. Equations 13 provides a step-wise function to mathematically provide an estimate of the coefficient of drag ($C_d$) based on the Reynolds number:

$$C_d = 10^{(1.3802112417116 - \log N_{RE})} \quad N_{RE} \leq 0.04 \quad \text{Eq. 13}$$

$$C_d = 10^{\begin{pmatrix} 1.4503131986 - 0.9043197142 \log N_{RE} + \\ 0.0594644891 (\log N_{RE})^2 + \\ 0.0136391233 (\log N_{RE})^3 \end{pmatrix}} \quad 0.04 < N_{RE} < 2{,}000$$

$$C_d = 0.4 \quad 2{,}000 \leq N_{RE} \leq 6{,}000$$

$$C_d = 10^{\begin{pmatrix} 50.018617877 - 44.799442653 \log N_{RE} + \\ 14.701249478 (\log N_{RE})^2 - \\ 2.1119561632 (\log N_{RE})^3 + \\ 0.112340369382 (\log N_{RE})^4 \end{pmatrix}} \quad 6{,}000 < N_{RE} \leq 100{,}000$$

$$C_d = 10^{\begin{bmatrix} 3.1908969689 + \\ 3.7715081936E7 \log N_{RE} - \\ 1.8571668496E7 (\log N_{RE})^2 + \\ 4.876747783E6 (\log N_{RE})^3 - \\ 7.2023948102E5 (\log N_{RE})^4 + \\ 5.6724016198E4 (\log N_{RE})^5 - \\ 1.8611888434E3 (\log N_{RE})^6 \end{bmatrix}} \quad 100{,}000 < N_{RE} \leq 230{,}000$$

$$C_d = 10^{\begin{bmatrix} -59.903600532 + \\ 30.176370129 \log N_{RE} - \\ 5.1228268992 (\log N_{RE})^2 + \\ 0.28985939161 (\log N_{RE})^3 \end{bmatrix}} \quad 230{,}000 < N_{RE} < 600{,}000$$

$$C_d = 0.22 \quad N_{RE} \geq 600{,}000$$

Equation 14, below, enables the particle Reynolds number to be evaluated using a relationship for the critical droplet size at a Weber number of 30 and the fundamental definition of Reynolds number.

$$N_{RE} = \frac{98.42518\sigma}{\mu_g v_g} \quad \text{Eq. 14}$$

where
$\sigma$=Interfacial (surface) tension between the liquid and gas;
$\mu_g$=Gas velocity, and
$v_g$=In situ average gas phase velocity.

Equations 12-14 include three equations with three unknown ($v_{g\text{-}crit}$, $C_d$, and $N_{RE}$), thus, a computational solution must be used to solve all three equations simultaneously, using Equation 12 as the basis function. The values of the unknowns may be evaluated until they converge to a solution. Once a solution is obtained, the critical gas phase velocity gas phase velocity for continuous transport of entrained liquid droplets in Equation 12 may be compared with the in situ average gas phase velocity ($v_g$). If the in situ average gas phase velocity ($v_g$) is greater than the critical gas phase velocity ($v_{g\text{-}crit}$), the flow of gas is sufficient to unload the liquids from the well, and no correction is required. If, on the other hand, the in situ average gas phase velocity ($v_g$) is less than the critical gas phase velocity ($v_{g\text{-}crit}$) for continuous liquid transport from the well, then the calculation of the in situ gas phase velocity may have been affected by fall back of liquid in the well because of the possibility that the in situ average gas phase velocity ($v_g$) is insufficient to unload liquids from the well.

Before making a correction to either the in situ average gas phase velocity ($v_g$) or the in situ supercritical gas phase velocity ($v_{sg}$), an evaluation of the flow type must be made. In the bubble flow regime, the gas phase is distributed as bubbles throughout the liquid phase. In the slug flow regime, a series of liquid slugs are separated by relatively large pockets of gas. The slugs occupy most of the cross-sectional area of the tubing. As will be explained, a correction for the bubble flow regime may use the relationships in Equations 15-17, below, and a correction for the slug flow regime may use the relationships in Equations 18-21, below. Other flow regimes are not treated herein because other flow regimes will generally be above the critical gas phase velocity.

In the bubble flow regime, the bubble rise velocity ($v_b$) may be computed using Eq. 15:

$$v_b = 1.5\left[\frac{g\sigma(\rho_l - \rho_g)}{\rho_l^2}\right]^{1/4} \qquad \text{Eq. 15}$$

where:

g=acceleration of gravity;

σ=Interfacial (surface) tension between the liquid and gas;

$\rho_l$=Liquid density; and $\rho_g$=Gas density.

Once the bubble rise velocity has been estimated, it may be used in a relationship to determine the liquid holdup. For tubular flow, one example of such a relationship is shown in Equation 16:

$$Y_w = 1 - \frac{v_{sg}}{1.97(v_{sg} + v_{sl}) + v_b} \qquad \text{Eq. 16}$$

where $v_{sg}$=in situ superficial gas phase velocity; and $v_{sl}$=in situ supercritical liquid phase velocity.

For annular flow, one example of such a relationship is shown in Equation 17:

$$Y_w = 1 - \frac{v_{sg}}{\left(1.97 + 0.371\frac{d_t}{d_c}\right)(v_{sg} + v_{sl}) + v_b} \qquad \text{Eq. 17}$$

where $v_{sg}$=in situ superficial gas phase velocity;

$v_{sl}$=in situ superficial liquid phase velocity;

$d_t$=outside diameter of the tubing; and $d_c$=inside diameter of the casing.

The in situ superficial liquid phase velocity ($v_{sl}$) may be measured using techniques that are known in the art, and the pipe diameters ($d_t$, $d_c$) are the known diameters of the tubular members in the well.

Depending on the flow, tubular or annular, the appropriate equation may then be equated to the right side of Equation 1, and the corrected in situ superficial gas phase velocity ($v_{sg}$) may be determined by solving for $v_{sg}$, using the computed liquid holdup values from Equation 1, the bubble rise velocity ($v_b$) computed using Equation 10, and the other known variables in Equation 16 or 17

In the slug flow regime, the Taylor bubble rise velocity ($v_{Tb}$) may be estimated depending on the flow situation, such as tubular or annular flow. For tubular flow, the Taylor bubble rise velocity ($v_{Tb}$) may be estimated using Equation 18:

$$v_{Tb} = 0.3 \left[ \frac{g d_i (\rho_l - \rho_g)}{\rho_l} \right]^{1/2} \qquad \text{Eq. 18}$$

where
g=acceleration of gravity;
$d_1$=Inside diameter of the tubing;
$\rho_l$=Liquid density; and
$\rho_g$=Gas density.

Using the Taylor bubble rise velocity for tubular slug flow, as determined in Equation 18, the liquid holdup may be estimated by the relationship in Equation 19:

$$Y_w = 1 - \frac{v_{sg}}{1.182(v_{sg} + v_{sl}) + v_{Tb}} \qquad \text{Eq. 19}$$

where
$v_{sg}$=in situ superficial gas phase velocity;
$v_{sl}$=in situ superficial liquid phase velocity;
$d_1$=outside diameter of the tubing; and
$d_c$=inside diameter of the casing.

The right side of Equation 19 may then be equated to the right side of Equation 1, and the corrected in situ superficial gas phase superficial velocity ($v_{sg}$) may be determined by solving for $v_{sg}$, using the computed liquid holdup values obtained from Equation 1, the Taylor bubble rise velocity ($v_{Tb}$) computed using Equation 18, and the other known variables in Equation 19.

For annular flow, the Taylor bubble rise velocity ($v_{Tb}$) may be estimated using Equation 20:

$$v_{TB} = \left( 0.3 + 0.22 \frac{d_t}{d_c} \right) \left[ \frac{g(d_c - d_i)(\rho_l - \rho_g)}{\rho_l} \right]^{1/2} \qquad \text{Eq. 20}$$

where
g=acceleration of gravity;
$d_t$=Outside diameter of the tubing;
$d_c$=Inside diameter of the casing;
$\rho_l$=Liquid density; and
$\rho_g$=Gas density.

Using the Taylor bubble rise velocity ($v_{Tb}$) for annular slug flow, as determined in Equation 20, the liquid holdup ($Y_w$) may be estimated by the relationship in Equation 21:

$$Y_w = 1 - \frac{v_{sg}}{\left( 1.182 + 0.9 \frac{d_t}{d_c} \right)(v_{sg} + v_{sl}) + v_{Tb}} \qquad \text{Eq. 21}$$

where
$v_{sg}$=in situ superficial gas phase velocity;
$v_{sl}$=in situ superficial liquid phase velocity;
$d_t$=outside diameter of the tubing; and
$d_c$=inside diameter of the casing.

The right side of Equation 21 may then be equated to the right side of Equation 1, and the corrected in situ superficial gas phase superficial velocity ($v_{sg}$) may be determined by solving for $v_{sg}$, using the liquid holdup values derived from Equation 1, the Taylor bubble rise velocity ($v_{Tb}$) computed using Equation 20, and the other known variables in Equation 21.

Figure 13:
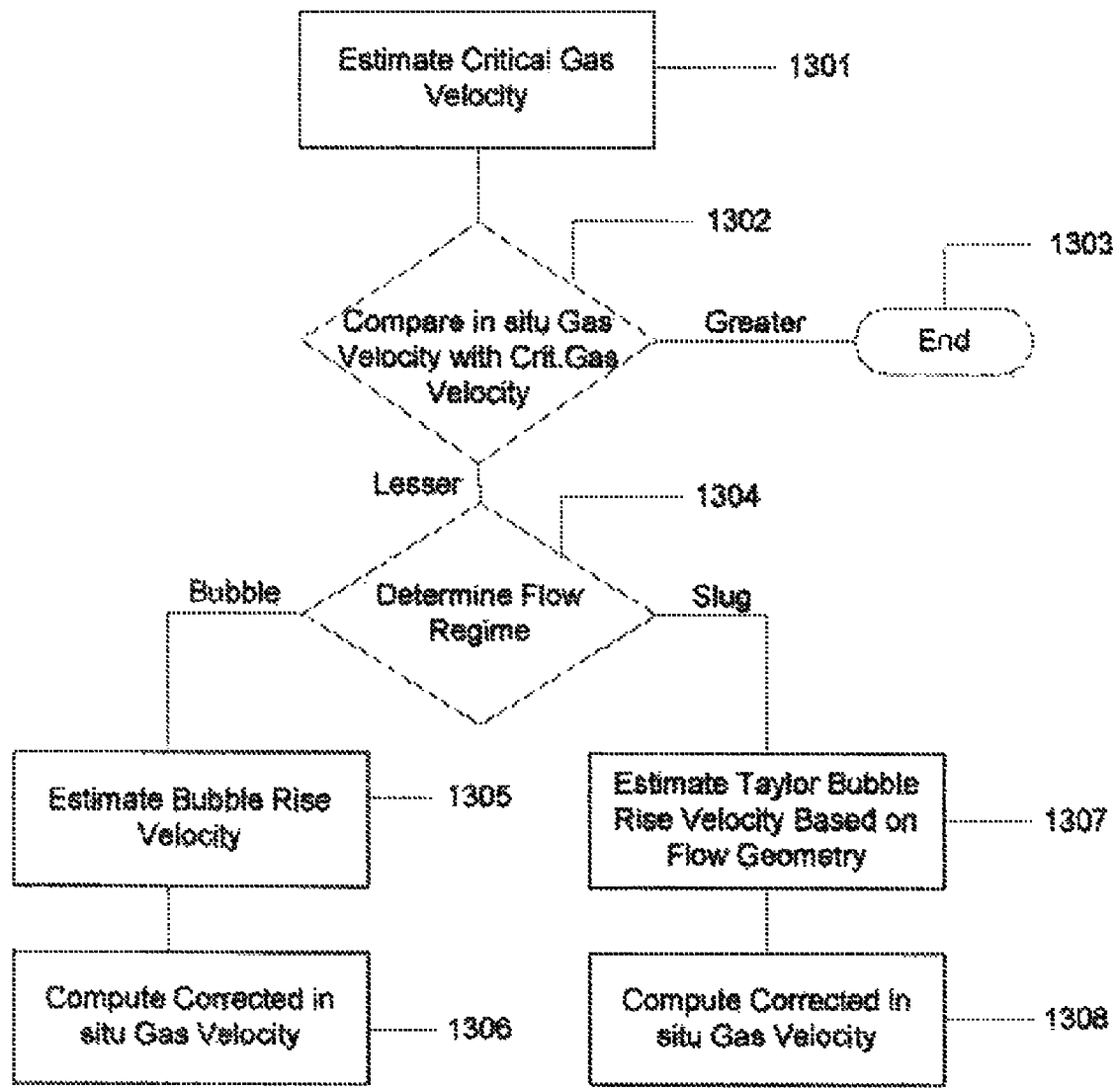
FIG. 13 shows one example of a method for correcting an in situ gas phase velocity.

FIG. 13 shows one example of a method for correcting an in situ gas phase velocity measurement. The method includes estimating the critical gas phase velocity, at step 1301. This is the minimum gas velocity at which the entrained liquid will be removed from the well. In one example, the critical gas velocity ($v_{g\text{-}crit}$) may be estimated using Equation 12, above. The method next includes comparing the in situ average gas phase velocity with the estimated critical gas phase velocity, at step 1302. In some examples, the in situ gas phase velocity is estimated using one or more to the methods described above and show, for example, in FIGS. 9-11.

If the in situ average gas phase velocity is greater than the estimated critical gas phase velocity, then the in situ average gas phase velocity is great enough to continuously unload the liquid from the well, and no correction for liquid fallback is required. Thus, if the in situ average gas phase velocity is greater than the estimated critical gas phase velocity, the decision may include ending the method, at step 1303.

If, however, the in situ average gas phase velocity is less than the critical gas phase velocity, then the in situ average gas phase velocity is not sufficient to continuously transport the entrained liquid particles and unload the well. The liquid particles may "fall back" into the well and collect at the bottom. In this case, the measurements and calculations for determining the inflow profile of the well, including the in situ gas phase velocity, may require correction for the liquid fall back.

In the case where the in situ average gas phase velocity is less than the estimated critical gas phase velocity, the method may next include determining the flow regime, at step 1304. In one example, the flow regime may be selected as either the bubble flow regime or the slug flow regime.

In the case where the flow regime is the bubble flow regime, the method may next include estimating the bubble rise velocity, at step 1305. In one example, the bubble rise velocity is estimated using Equation 15, above. The method may also include computing a corrected in situ gas phase velocity, at step 1306. In one example for tubular flow, the corrected in situ gas phase velocity is determined by setting the right side of Equation 1, above, equal to the right side of Equation 16, above. In another example for annular flow, the corrected in situ gas phase velocity is determined by setting the right side of Equation 1, above, equal to the right side of Equation 17, above.

In the case where the flow is in the slug flow regime, the method may include estimating the Taylor bubble rise velocity at step 1307, and then computing the corrected in situ gas phase velocity, as step 1308. In one example for tubular flow, the Taylor bubble rise velocity is computed using Equation 18, above. In a further example, the corrected in situ gas phase velocity is determined by setting the right side of Equation 1, above, equal to the right side of Equation 19, above. In another example for annular flow, the Taylor bubble rise velocity is computed using Equation 20, above. In a further example, the corrected in situ gas phase velocity is determined by setting the right side of Equation 1, above, equal to the right side of Equation 21, above.

Although this detailed description has shown and described illustrative embodiments of the invention, this description contemplates a wide range of modifications, changes, and substitutions. In some instances, some features of the present invention may be employed without a corresponding use of other features. Accordingly, it is appropriate that readers should construe the appended claims broadly, and in a manner consistent with the scope of the invention.

What is claimed is:

1. A method for evaluating an inflow performance for completed intervals in a well, comprising:
   pulsing neutrons into a fluid flow in the well;
   detecting gamma rays from decays of nitrogen-16 in the fluid flow with a first gamma ray sensor to generate a measurement of gamma ray decays;
   determining an in situ water velocity from the measurement of the gamma ray decays by:
      measuring a first time for activated oxygen to flow from a pulsed neutron generator to the first gamma ray sensor; and
      dividing a first distance between the pulsed neutron generator and the first gamma ray sensor by the first time for the activated oxygen to flow from pulsed neutron generator to the first gamma ray sensor;
   estimating the inflow performance for each of the completed intervals in the well based on a change in the in situ water velocity, wherein inflow performance of a first one of the completed intervals is determined by subtracting at least data collected relating to a second one of the completed intervals from the fluid flow; and
   correcting the in situ water velocity to generate a corrected in situ water velocity for a hydraulic flow area in the fluid flow, determined using an inside diameter of a flow conduit and a cross sectional area of a pulsed neutron logging tool comprising the pulsed neutron generator and the first gamma ray sensor, using following equations:

$$v_{wc} = v_{wl} \frac{A_{pt}}{A_P}$$

$$A_{pt} = 0.005454\, d_e^2.$$

wherein $v_{wc}$ represents the corrected in situ water velocity, $v_{wl}$ represents log-reported water velocity, $A_{pt}$ represents hydraulic area around the pulsed neutron logging tool, and $A_p$ represents cross sectional area of the fluid flow, and
   wherein $d_e$ is equal to (D−d), d represents outside diameter of the pulsed neutron logging tool, and D represents inside diameter of the flow conduit, and
   wherein area is in units of square feet and diameter is in units of inches.

2. The method of claim 1, wherein the estimating the inflow performance comprises using the in situ water velocity in a multiphase flow correlation.

3. The method of claim 1, wherein the hydraulic area around the pulsed neutron logging tool is computed using following equation:

$$d_e = \sqrt{D^2 + d^2 - \frac{D^2 - d^2}{\ln\left(\frac{D}{d}\right)}}.$$

4. The method of claim 1, wherein the hydraulic area around the pulsed neutron logging tool is computed using following equation:

$$d_e = \sqrt{\frac{2}{3}(D-d)}.$$

5. The method of claim 1, wherein the hydraulic area around the pulsed neutron logging tool is computed using following equation:

$$d_e = \frac{\sqrt[4]{D^4 - d^4 - \frac{(D^2 - d^2)^2}{\ln\left(\frac{D}{d}\right)}} + \sqrt{D^2 - d^2}}{2}.$$

6. The method of claim 1, wherein the determining the first time for the activated oxygen to flow from the pulsed neutron generator to the first gamma ray sensor comprises determining a time for a local maximum in a count rate by the gamma ray detector.

7. The method of claim 1, wherein the pulsed neutron generator and the first gamma ray sensor are disposed in a downhole tool positioned in a production tubular.

8. The method of claim 7, wherein the fluid flow is downward in an annulus outside of the production tubular.

9. The method of claim 7, wherein the fluid flow is upward in an annulus outside of the production tubular.

10. The method of claim 7, wherein the fluid flow is downward in the production tubular.

11. The method of claim 7, wherein the fluid flow is upward in the production tubular.

12. The method of claim 1, wherein determining the in situ water velocity further comprises:
    determining a second time for activated oxygen to flow from the pulsed neutron generator to a second gamma ray sensor;
    dividing a second distance between the pulsed neutron generator and the second gamma ray sensor by the second time; and
    determining the in situ water velocity from the dividing the first distance by the first time and the dividing the second distance by the second time.

13. The method of claim 1, wherein the fluid flow comprises production flow.

14. The method of claim 1, wherein the fluid flow comprises injection flow.

15. A method for profiling multiphase fluid flow in a well, comprising:
    pulsing a first pulse of neutrons into the fluid flow;
    detecting gamma rays from inelastic collisions between the first pulsed neutrons and a nuclei in the fluid flow;
    determining an inelastic count rate of the production from the detected gamma rays from the inelastic collisions;
    determining a liquid holdup of the fluid based on the inelastic count rate;
    pulsing a second pulse of neutrons into the fluid flow;
    detecting gamma rays from decays of nitrogen-16 in the fluid flow with a first gamma ray sensor to generate a measurement of gamma ray decays;
    determining a water velocity in the fluid flow from the measurement of the gamma ray decays by:
        determining a time for activated oxygen to flow from a pulsed neutron generator to the first gamma ray sensor; and dividing a distance between the pulsed neutron generator and the first gamma ray sensor by a time for the activated oxygen to flow from the pulsed neutron generator to the first gamma ray sensor;

estimating an inflow performance for each of completed intervals in the well based on a change in the liquid holdup and the water velocity, wherein inflow performance of a first one of the completed intervals is determined by subtracting at least data collected relating to a second one of the completed intervals from the fluid flow; and correcting the water velocity to generate a corrected water velocity for a hydraulic flow area in the fluid flow determined using an inside diameter of a flow conduit and a cross sectional area of a pulsed neutron logging tool comprising the pulsed neutron generator and the first gamma ray sensor, using following equations:

$$v_{wc} = v_{wl} \frac{A_{pt}}{A_p}$$

$$A_{pt} = 0.005454 \, d_e^2.$$

wherein $v_{wc}$ represents the corrected water velocity, $v_{wl}$ represents log-reported water velocity, $A_{pt}$ represents hydraulic area around the pulsed neutron logging tool, and $A_p$ represents cross sectional area of the fluid flow, and wherein $d_e$ is equal to (D−d), d represents outside diameter of the pulsed neutron logging tool, and D represents inside diameter of the flow conduit, and wherein area is in units of square feet and diameter is in units of inches.

16. The method of claim 15, further comprising determining an in situ gas phase velocity and a slip velocity from the liquid holdup and the water velocity.

17. The method of claim 16, wherein the in situ gas phase velocity is an in situ superficial gas phase velocity.

18. The method of claim 16, wherein the in situ gas phase velocity is an in situ average gas phase velocity.

19. The method of claim 16, further comprising:
estimating a critical gas phase velocity;
when the critical gas phase velocity is greater than an in situ average gas phase velocity, the method further comprising:
determining a flow regime;
estimating a bubble rise velocity; and
computing a corrected in situ gas phase velocity.

20. The method of claim 16, wherein determining the in situ gas phase velocity and the slip velocity comprises using a root solving solution.

21. The method of claim 16, wherein determining the in situ gas phase velocity and the slip velocity comprises using an inverse interpolation.

22. The method of claim 15, further comprising using a multiphase flow correlation to determine flow characteristics for the well.

23. A downhole tool, comprising:
a pulsed neutron generator; and
at least one gamma ray detector,
wherein the downhole tool is configured to:
measure a velocity of water in a well fluid;
measure an inelastic count rate;
determine a liquid holdup of the well fluid based on the inelastic count rate;
determine an in situ gas phase velocity and a slip velocity from the liquid holdup and the velocity of water;
estimate a critical gas phase velocity;
when the critical gas phase velocity is greater than the in situ average gas phase velocity, the downhole tool is further configured to:
determine a flow regime;
estimate a bubble rise velocity; and
compute a corrected in situ gas phase velocity.

24. The downhole tool of claim 23, wherein the well fluid is flowing in an annulus outside of a production tubing.

25. The downhole tool of claim 23, wherein the at least one gamma ray detector comprises;
a near gamma ray detector located a first distance from the pulsed neutron generator;
a far gamma ray detector located a second distance from the pulsed neutron generator; and
a third gamma ray detector located a third distance from the pulsed neutron generator,
wherein the third distance is greater than the second distance, and wherein the second distance is greater than the first distance.

26. A method for profiling multiphase fluid flow in a well, comprising:
pulsing a first pulse of neutrons into the fluid flow at a plurality of locations in the well;
detecting gamma rays from inelastic collisions between the first pulsed neutrons and a nuclei in the fluid flow at the plurality of locations;
determining an inelastic count rate of a plurality of production zones from the gamma rays detected from the inelastic collisions at the plurality of locations;
determining a liquid holdup at the plurality of locations based on the inelastic count rate at the plurality of locations, wherein determining the liquid holdup is performed using following equation:

$$Y_w(z) = \frac{I_{ratg} - I_{rat}(z)}{I_{ratg} - I_{ratw}}.$$

wherein $I_{ratw}$, represents minimum inelastic count rate where the fluid flow is 100% water, $I_{ratg}$ represents maximum inelastic count rate where the fluid flow is 100% gas, z represents a logged depth, $Y_w(z)$ represents the liquid holdup at the logged depth, and $I_{rat}(z)$ represents recorded inelastic count rate at the logged depth;
pulsing a second pulse of neutrons into the fluid flow at the plurality of locations;
detecting gamma rays from decays of nitrogen-16 in the fluid flow at the plurality of locations;
determining a water velocity in the fluid flow at the plurality of locations; and
determining the inflow performance of each of the plurality of production zones in the well based on a change in the liquid holdup and the water velocity at the plurality of locations, wherein inflow performance of a first one of the plurality of production zones is determined by subtracting at least data collected relating to a second one of the plurality of production zones from the fluid flow.

27. The method of claim 26, further comprising determining a pressure of the fluid flow, a fluid mixture density distribution of the fluid flow, an in situ gas velocity of the fluid flow, a slip velocity of the fluid flow, and a wellbore velocity profile for phases in the fluid flow.

28. A method for evaluating an inflow performance for completed intervals in a well, comprising:
pulsing neutrons into a fluid flow in the well;
detecting gamma rays from inelastic collisions between the pulsed neutrons and a nuclei in the fluid flow;
determining an inelastic count rate of the fluid from the detected gamma rays from the inelastic collisions;
determining a liquid holdup of the fluid flow from the inelastic count rate, wherein determining the liquid holdup is performed using following equation:

$$Y_w(z) = \frac{I_{ratg} - I_{rat}(z)}{I_{ratg} - I_{ratw}}.$$

wherein $I_{ratw}$ represents minimum inelastic count rate where the fluid flow is 100% water, $I_{ratg}$ represents maximum inelastic count rate where the fluid flow is 100% gas, z represents a logged depth, $Y_w(z)$ represents the liquid holdup at the logged depth, and $I_{rat}(Z)$ represents recorded inelastic count rate at the logged depth; and
determining the inflow performance for each of the completed intervals in the well based on a change in the liquid holdup, wherein inflow performance of a first one of the completed intervals is determined by subtracting at least data collected relating to a second one of the completed intervals from the fluid flow.

29. A method for correcting an estimate of an in situ gas phase velocity approximation, comprising:
estimating a critical gas phase velocity;
when the critical gas phase velocity is greater than an in situ average gas phase velocity, the method further comprising:
determining a flow regime;
estimating a bubble rise velocity; and
estimating a corrected in situ gas phase velocity.

30. The method of claim 29, wherein the corrected in situ gas phase velocity is an in situ superficial gas phase velocity.

31. The method of claim 29, wherein the corrected in situ gas phase velocity is an in situ average gas phase velocity.

32. The method of claim 29, wherein estimating the critical gas phase velocity is performed by simultaneously solving following equations along with an estimation of a coefficient of drag to generate a simultaneous solution:

$$v_g = \frac{1.2978[\sigma(\rho_l - \rho_g)]^{1/4}}{C_d^{1/4} \rho_g^{1/2}}; \text{ and}$$

$$N_{BE} = \frac{98.42518\sigma}{\mu_g v_g}.$$

wherein $v_g$ represents in situ gas phase velocity, $\sigma$ represents interfacial surface tension between liquid and gas, $\rho_l$ represents liquid density, $\rho_g$ represents gas density, $C_d$ represents the coefficient of drag, $N_{RE}$ represents Reynolds number, and $\mu_g$ represents gas viscosity.

33. The method of claim 32, wherein the simultaneous solution includes a step-wise continuous function for the coefficient of drag based on the Reynolds number.

34. The method of claim 33, wherein the step-wise continuous function is defined by following equations:

$$C_d = 10^{(1.3802112417116 - \log N_{RE})} \qquad N_{gg} \leq 0.04$$

$$C_d = 10^{\begin{pmatrix} 1.4503131986 - 0.9043197142\log N_{RE} + \\ 0.0594644891(\log N_{RE})^2 + \\ 0.0136391233(\log N_{RE})^3 \end{pmatrix}} \qquad 0.04 < N_{RE} < 2{,}000$$

$$C_d = 0.4 \qquad 2{,}000 \leq N_{RE} \leq 6{,}000$$

$$C_d = 10^{\begin{pmatrix} 50.018617877 - 44.7994426531\log N_{RE} + \\ 14.701249478(\log N_{RE})^2 - \\ 2.1119561632(\log N_{RE})^3 + \\ 0.11234036938(\log N_{RE})^4 \end{pmatrix}} \qquad 6{,}000 < N_{RE} \leq 1000{,}000$$

$$C_d = 10^{\begin{bmatrix} 3.1908969689 + \\ 3.7715081936E7\log N_{RE} - \\ 1.8571668496E7(\log N_{RE})^2 + \\ 4.876747783E6(\log N_{RE})^3 - \\ 7.2023948102E5(\log N_{RE})^4 + \\ 5.6724016198E4(\log N_{RE})^5 - \\ 1.8611888434E3(\log N_{RE})^6 \end{bmatrix}} \qquad 100{,}000 < N_{RE} \leq 230{,}000$$

$$C_d = 10^{\begin{bmatrix} -59.903600532 + \\ 30.17637012\log N_{RE} - \\ 5.1228268992(\log N_{RE})^2 + \\ 0.289859391 6(\log N_{RE})^3 1 \end{bmatrix}} \qquad 230{,}000 < N_{RE} < 600{,}000$$

$$C_d = 0.22 \qquad N_{RE} \geq 600{,}000$$

35. The method of claim 29, wherein determining the flow regime comprises determining one selected from a bubble flow regime and a slug flow regime.

36. The method of claim 29, wherein determining the flow regime comprises determining a bubble flow regime.

37. The method of claim 36, wherein estimating the bubble rise velocity is performed using following equation:

$$v_b = 1.5 \left[ \frac{g\sigma(\rho_l - \rho_g)}{\rho_l^2} \right]^{1/4}$$

wherein $v_b$ represents the bubble rise velocity, g represents acceleration of gravity, $\sigma$ represents interfacial surface tension between liquid and gas, $\rho_l$ represents liquid density, and $\rho_g$ represents gas density.

38. The method of claim 37, wherein a flow geometry is tubular.

39. The method of claim 38, wherein estimating the corrected in situ gas phase velocity is performed using following equation:

$$\frac{I_{ratg} - I_{rat}(z)}{I_{ratg} - I_{ratw}} = 1 - \frac{v_{sg}}{1.97(v_{sg} + v_{sl}) + v_b}$$

wherein $I_{ratw}$ represents minimum inelastic count rate where the fluid flow is 100% water, $I_{ratg}$ represents maximum inelastic count rate where the fluid flow is 100% gas, z represents a logged depth, $I_{rat}(z)$ represents recorded inelastic count rate at the logged depth, $v_{sg}$ represents in situ superficial gas phase velocity, $v_{sl}$ represents in situ superficial liquid phase velocity, and $v_b$ represents bubble rise velocity.

40. The method of claim 37, wherein a flow geometry is annular.

41. The method of claim 40, wherein estimating the corrected in situ gas phase velocity is performed using the following equation:

$$\frac{I_{ratg} - I_{rat}(z)}{I_{ratg} - I_{ratw}} = 1 - \frac{v_{sg}}{\left(1.97 + 0.371\frac{d_t}{d_c}\right)(v_{sg} + v_{sl}) + v_b}$$

wherein $I_{ratw}$ represents minimum inelastic count rate where the fluid flow is 100% water, $I_{ratg}$ represents maximum inelastic count rate where the fluid flow is 100% gas, z represents a logged depth, $I_{rat}(z)$ represents recorded inelastic count rate at the logged depth, $v_{sg}$ represents in situ superficial gas phase velocity, $v_{sl}$ represents in situ superficial liquid phase velocity, $v_b$ represents bubble rise velocity, $d_t$ represents outside diameter of a tubing, and $d_c$ represents inside diameter of a casing.

42. The method of claim 29, wherein determining the flow regime comprises determining a slug flow regime.

43. The method of claim 42, wherein a flow geometry is tubular.

44. The method of claim 43, wherein estimating the bubble rise velocity comprises estimating Taylor bubble rise velocity.

45. The method of claim 44, wherein estimating the Taylor bubble rise velocity is performed using following equation:

$$v_{Tb} = 0.3\left[\frac{gd_t(\rho_l - \rho_g)}{\rho_l}\right]^{1/2}$$

wherein $v_{Tb}$ represents the Taylor bubble rise velocity, g represents acceleration of gravity, $d_t$ represents outside diameter of a tubing, $\rho_l$ represents liquid density, and $\rho_g$ represents gas density.

46. The method of claim 45, wherein estimating the corrected in situ gas phase velocity is performed using the following equation:

$$\frac{I_{ratg} - I_{rat}(z)}{I_{ratg} - I_{ratw}} = 1 - \frac{v_{sg}}{1.182(v_{sg} + v_{sl}) + v_{Tb}}$$

wherein $I_{ratw}$ represents minimum inelastic count rate where the fluid flow is 100% water, $I_{ratg}$ represents maximum inelastic count rate where the fluid flow is 100% gas, z represents a logged depth, $I_{rat}(z)$ represents recorded inelastic count rate at the logged depth, $v_{sg}$ represents in situ superficial gas phase velocity, and $v_{sl}$ represents in situ superficial liquid phase velocity.

47. The method of claim 42, wherein a flow geometry is annular.

48. The method of claim 47, wherein estimating the bubble rise velocity comprises estimating the Taylor bubble rise velocity.

49. The method of claim 48, wherein estimating the Taylor bubble rise velocity is performed using following equation:

$$v_{Tb} = \left(0.3 + 0.22\frac{d_t}{d_c}\right)\left[\frac{g(d_c - d_t)(\rho_l - \rho_g)}{\rho_l}\right]^{1/2}$$

wherein $v_{Tb}$ represents the Taylor bubble rise velocity, g represents acceleration of gravity, $d_t$ represents outside diameter of a tubing, $d_c$ represents inside diameter of a casing, $\rho_l$ represents liquid density, and $\rho_g$ represents gas density.

50. The method of claim 49, wherein estimating the corrected in situ gas phase velocity is performed using following equation:

$$\frac{I_{ratg} - I_{rat}(z)}{I_{ratg} - I_{ratw}} = 1 - \frac{v_{sg}}{\left(1.182 + 0.9\frac{d_t}{d_c}\right)(v_{sg} + v_{sl}) + v_{Tb}}$$

wherein $I_{ratw}$ represents minimum inelastic count rate where the fluid flow is 100% water, $I_{ratg}$ represents maximum inelastic count rate where the fluid flow is 100% gas, z represents a logged depth, $I_{rat}(z)$ represents recorded inelastic count rate at the logged depth, $v_{sg}$ represents in situ superficial gas phase velocity, and $v_{sl}$ represents in situ superficial liquid phase velocity.

* * * * *